United States Patent
Oh et al.

(10) Patent No.: US 9,594,479 B2
(45) Date of Patent: Mar. 14, 2017

(54) MOBILE TERMINAL AND METHOD OF CONTROLLING THE SAME

(71) Applicant: LG ELECTRONICS INC., Seoul (KR)

(72) Inventors: Younju Oh, Seoul (KR); Jungmun Chung, Seoul (KR); Jihoon Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 408 days.

(21) Appl. No.: 14/250,104

(22) Filed: Apr. 10, 2014

(65) Prior Publication Data

US 2015/0128078 A1  May 7, 2015

(30) Foreign Application Priority Data

Nov. 5, 2013 (KR) .................... 10-2013-0133689

(51) Int. Cl.
   *G06F 3/048* (2013.01)
   *G06F 3/0484* (2013.01)
   *G06F 3/0481* (2013.01)
   *G06F 3/0488* (2013.01)
   *G06F 1/16* (2006.01)

(52) U.S. Cl.
   CPC .......... *G06F 3/0484* (2013.01); *G06F 1/1692* (2013.01); *G06F 3/0481* (2013.01); *G06F 3/0488* (2013.01); *G06F 2203/04808* (2013.01)

(58) Field of Classification Search
   CPC ...... G09G 5/38; H04M 1/72519; H04M 1/00; G06F 3/0346; G06F 1/1637; G06F 3/041; G06F 3/048; G06F 3/01
   See application file for complete search history.

(56) References Cited

U.S. PATENT DOCUMENTS

| | | | |
|---|---|---|---|
| 2010/0026719 A1* | 2/2010 | Ozawa | G06F 3/0483 345/650 |
| 2010/0056220 A1* | 3/2010 | Oh | G06F 1/1616 455/566 |
| 2011/0021251 A1* | 1/2011 | Linden | G06F 1/1616 455/566 |
| 2011/0291946 A1 | 12/2011 | Mann et al. | |
| 2012/0068936 A1 | 3/2012 | Kim | |
| 2013/0100035 A1* | 4/2013 | Papakipos | G06F 1/169 345/173 |

(Continued)

FOREIGN PATENT DOCUMENTS

KR  10-2008-0102503 A  11/2008
KR  10-2013-0090965 A  8/2013

*Primary Examiner* — Rashawn Tillery
(74) *Attorney, Agent, or Firm* — Birch, Stewart, Kolasch & Birch, LLP

(57) ABSTRACT

A mobile terminal including a display unit arranged on the front surface so multiple pieces of visual information corresponding to multiple layers, respectively; and a front-surface input unit so a control command is input into the front-surface input unit and a rear input unit arranged on the rear surface so the control command is input into the rear input unit; and a controller to apply a function corresponding to an input to first visual information displayed on a first layer, and activate a second layer arranged under the first layer while maintaining a state in which the first visual information is displayed on the first layer in response to input to the rear input unit.

19 Claims, 20 Drawing Sheets

(56) References Cited

U.S. PATENT DOCUMENTS

| | | | |
|---|---|---|---|
| 2013/0154924 A1* | 6/2013 | Hong | G06F 1/1626 345/157 |
| 2013/0215064 A1* | 8/2013 | Cholewin | G06F 1/1626 345/173 |
| 2014/0078086 A1* | 3/2014 | Bledsoe | G06F 3/041 345/173 |
| 2014/0347330 A1* | 11/2014 | Kim | G06F 1/1637 345/184 |
| 2015/0024728 A1* | 1/2015 | Jang | H04M 1/72519 455/418 |
| 2015/0062181 A1* | 3/2015 | Lee | G09G 5/38 345/659 |
| 2015/0160775 A1* | 6/2015 | Chiashi | G06F 3/0488 345/173 |

* cited by examiner

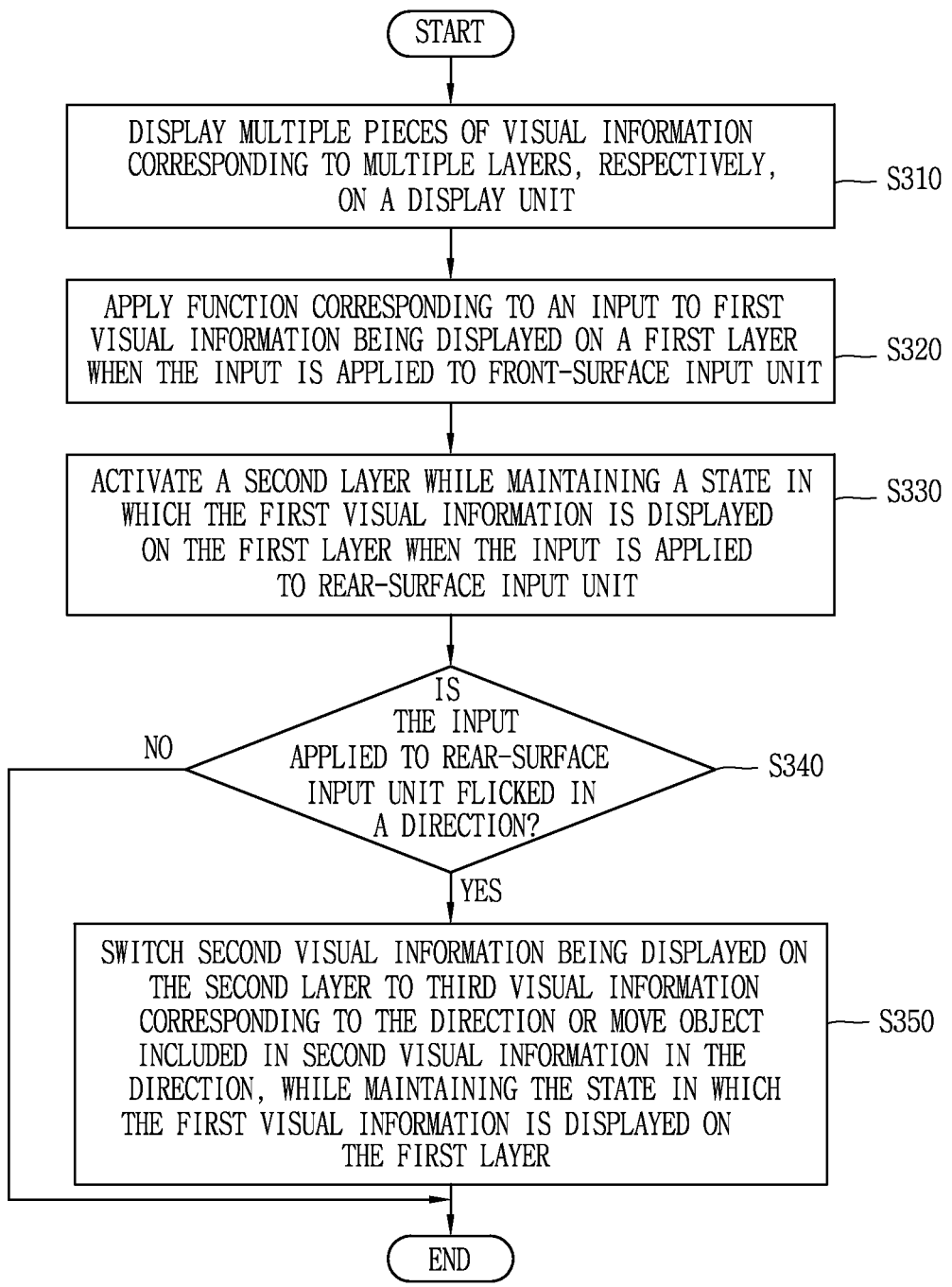

MOBILE TERMINAL AND METHOD OF CONTROLLING THE SAME

CROSS REFERENCE TO RELATED APPLICATIONS

Pursuant to 35 U.S.C. §119A, this application claims the benefit of earlier filing date and right of priority to Korean Application No. 10-2013-0133689 filed on Nov. 5, 2013 the contents of which is incorporated by reference herein in its entirety.

TECHNICAL FIELD

The present invention relates to a mobile terminal equipped with a user input unit into which a control command is input.

BACKGROUND ART

A mobile terminal is a device that can be carried around and has one or more functions such as to perform voice and video call communications, inputting and outputting information, storing data, and the like.

As functions of the terminal become more diversified, the terminal can support more complicated functions such as writing memos, receiving and transmitting e-mails and managing schedules. By comprehensively and collectively implementing such functions, the mobile terminal may be embodied in the form of a multimedia player or a device.

Various attempts have been made to implement complicated functions in such a multimedia device by means of hardware or software. As one example, a user interface for allowing a user to easily and conveniently search for or select a function is being provided.

In addition, a user of the mobile terminal tends to consider his/her mobile terminal as a personal possession that characterizes his/her individuality, and this requires various design-reflected construction of the mobile terminal. The design-reflected construction includes changes and improvements in construction that are made to enable the user to use the mobile terminal in a more convenient manner. A user display unit is considered as one of the components that need the changes and improvements in construction.

On the other hand, generally, the user can perform multitasking by executing multiple applications on one screen of the mobile terminal. In this case, a previously selected application is displayed on a lower layer and a later selected application is displayed on a higher layer. Accordingly, the most recently selected application or an application that is currently being executed is displayed on the uppermost layer. If the multitasking is performed in a state where the multiple applications are executed in this manner, in order to have access to an application being executed on the lowermost layer while executing an application on the uppermost layer, first, the user has to select the application being executed on the lowermost layer and then display that application on the uppermost layer.

Particularly, if the user desires to have access to the previously selected application and to input a predetermined control command while continuously maintaining the application that is currently being executed, he/she will have not only the inconvenience of having to perform many operations to switch between the applications, but also the difficulty in executing a specific command for controlling only the application that is executed on the lower layer.

DISCLOSURE OF THE INVENTION

Therefore, an object of the present invention is to provide a mobile terminal that is capable of controlling an application being executed on a lower layer of a display unit in an intuitive, easy manner, using a new type of user input unit provided on a rear-surface of the mobile terminal.

Another object of the present invention is to provide a mobile terminal that is capable of applying a specific function different from an existing one directly to an application being executed on a higher layer of a display unit, using a new type of user input unit provided on a rear-surface of the mobile terminal.

To achieve these and other advantages and in accordance with the purpose of the present invention, as embodied and broadly described herein, there is provided a mobile terminal including: a mobile terminal body that includes a front surface and a rear surface; a display unit that is arranged on the front surface and is formed in such a manner that multiple pieces of visual information corresponding to multiple layers, respectively, are displayed on the display unit; and a front-surface input unit that is arranged on the front surface and is formed in such a manner that a control command is input into the front-surface input unit and a rear input unit that is arranged on the rear surface and is formed in such a manner that the control command is input into the rear input unit; and a controller that, in response to application of an input to the front-surface input unit, applies a function corresponding to the input to first visual information that is displayed on a first layer, and the controller that, in response to application of an input to the rear input unit, activates a second layer that is arranged under the first layer while maintaining a state in which the first visual information is displayed on the first layer.

In the mobile terminal, the first visual information may be a screen corresponding to a first application being executed on the uppermost layer of the display unit, and the second visual information may be a screen corresponding to a second application being executed on the lowermost layer of the display unit.

In the mobile terminal, based on application of a flicking touch input in one direction to the rear input unit, the controller may switch second visual information being displayed on the second layer to third visual information corresponding to the one direction or may move an object included in the second visual information in the one direction while maintaining the state in which the first visual information is displayed on the first layer.

In the mobile terminal, the front-surface input unit and the display unit may be integrated into a touch screen, and in a state where the input is applied to the rear input unit, when it is detected that a flicking touch input in one direction is applied to the touch screen, the controller may switch second visual information being displayed on the second layer to third visual information corresponding to the one direction or may move an object included in the second visual information in the one direction, while maintaining the state in which the first visual information is displayed on the first layer.

In the mobile terminal, in response to rotation of the input applied to the rear input unit in a first direction, the controller may decrease an output range of second visual information being displayed on the second layer while maintaining the state in which the first visual information is displayed on the first layer, and in response to the rotation of the input applied to the rear input unit in a second direction, the controller may increase the output range of the second visual information being displayed on the second layer while maintaining the state in which the first visual information is displayed on the first layer.

In the mobile terminal, the controller may determine in a different manner whether or not the first layer is activated, according to the order in which the input is applied to the front-surface input unit and the rear input unit.

In the mobile terminal, when a touch event occurs on the rear input unit, the controller may display a first icon corresponding to the touch event on one region of the display unit, and in a state where the first icon is displayed, when a touch-up event occurs on the rear input unit, the controller may perform control in such a manner that the first icon disappears from the display unit.

In the mobile terminal, in response to successive application of a first and second inputs to the rear input unit, the controller may perform control in such a manner that an application associated with an object displayed on a region corresponding to the first input is executed on the second layer, while maintaining the state in which the first visual information is displayed on the first layer.

In the mobile terminal, if the rear input unit is configured in such a manner that a touch input can be applied to the rear input unit and multiple layers are arranged as lower layers under the first layer, based on a speed and strength of the touch input being applied to the rear input unit, the controller may determine the number of layers to be activated as the second layers, among the multiple layers, while maintaining the state in which the first visual information is displayed on the first layer.

In the mobile terminal, the front-surface input unit and the display unit may be integrated into a touch screen, and when a first touch input is applied to the touch screen, the controller may apply a function corresponding to the first touch input to the first visual information, and in a state where the input is applied to the rear input unit, when the first touch input is applied to the touch screen, the controller may display the function corresponding to the first touch input to second visual information being displayed on the second layer, while maintaining the state in which the first visual information is displayed on the first layer.

In the mobile terminal, if the function corresponding to the first touch input is applied to the first visual information, the controller may display information relating to execution of the function corresponding to the first touch input on a higher layer over the first layer and if the function corresponding to the first touch input is applied to the second visual information according to the input into the rear input unit, the controller may perform control in such a manner that the information relating to the execution of the function corresponding to the first touch input is displayed on a lower layer under the first layer or on one region of the first layer that does not overlap the first visual information.

In the mobile terminal, in a state where a touch input is applied to the rear input unit, in response to dragging of the touch applied to the touch screen within a region on which the first visual information is displayed, the controller may adjust transparency of the first visual information being displayed on the first layer according to a moving path and a touch trace of the touch.

In the mobile terminal, in response to the adjustment of the transparency of the first visual information according to the touch, the controller may make visible at least one portion of the second visual information that is covered with the first visual information while maintaining the state in which the first visual information is displayed on the first layer, and in response to return of the first visual information to its original state according to the passage of a predetermined time, the controller may make at least one portion of the second visual information covered back with the first visual information, while maintaining a state in which the second visual information is displayed on the second layer.

In the mobile terminal, the display unit including the first and second layers may be configured in such a manner that the input can be applied to the display unit, and when a first touch input is applied to a region on which the first visual information is displayed, the controller may apply a first function to the region on which the first visual information is displayed, and in a state where the first touch input is applied to the region on which the first visual information is displayed, when it is detected that the input is applied to the rear input unit, the controller may perform control in such a manner that the first function is set to be locked.

In the mobile terminal, the controller may perform control in such a manner that when a second touch input is applied to a region on which the first visual information is displayed, a second function is applied to the region on which the first visual information is displayed, and in such a manner that in a state where the input is applied to the rear input unit, when it is detected that a second touch input is applied to the region on which the first visual information is displayed, a third function different from the second function is applied to the region on which the first visual information is displayed.

In the mobile terminal, the front-surface input unit and the display unit may be integrated into a touch screen, and in the state where the input is applied to the rear input unit, when the touch applied to the display unit is dragged in one direction, the controller may adjust an application level of the third function in a different manner according to the direction in which the touch is dragged and the extent to which the touch is dragged.

In the mobile terminal, in the state where the input is applied to the rear input unit, when the touch applied to a region on which the first visual information is displayed is dragged in a first direction, the controller may gradually decrease the application level of the third function, while maintaining the state in which the first visual information is displayed on the first layer, and in the state where the input is applied to the rear input unit, when the touch is dragged in a second direction, the controller may gradually increase the application level of the third function, while maintaining the state in which the first visual information is displayed on the first layer.

In the mobile terminal, in a state where the third function is applied to the first visual information, when a touch-up event occurs on the rear input unit, the controller may perform control in such a manner that the display of the first visual information return to its state that is present before the third function is applied.

In the mobile terminal, in a state where the input is applied to the rear input unit and the second layer is activated, if the input is successively applied to a specific key on the front-surface input unit or a lateral-surface input unit, the controller may perform control in such a manner that states of the second layer and the first layer are switched.

To achieve these and other advantages and in accordance with the purpose of the present invention, as embodied and broadly described herein, there is provided a method of controlling a mobile terminal, including: a step of displaying multiple pieces of visual information corresponding to multiple layers, respectively, on a display unit; a step of applying a function corresponding to an input to first visual information being displayed on a first layer of the display unit in response to application of the input to a front-surface of the mobile terminal; a step of activating a second layer arranged under the first layer while maintaining a stare in which the first visual information is displayed on the first layer, in response to the application of the input to a rear input unit; and a step of switching second visual information being displayed on the second layer to third visual information corresponding to one direction or moving an object included in the second visual information in the one direction while maintaining the state in which the first visual information is displayed on the first layer, based on flicking of the input into the rear input unit in one direction.

BRIEF DESCRIPTION OF THE DRAWINGS

FIG. 3 is an exemplary flowchart of a method of controlling applications that are executed in multiple layers, respectively, in the mobile terminal according to one embodiment of the present invention;

MODES FOR CARRYING OUT THE PREFERRED EMBODIMENTS

Reference will now be made in detail to the preferred embodiments of the present invention, examples of which are illustrated in the accompanying drawings.

For the sake of brief description with reference to the drawings, the same or equivalent components will be provided with the same reference numbers, and description thereof will not be repeated. A singular expression in the present invention may include a plural meaning unless it is distinctively defined. The suffixes attached to components of the wireless speaker, such as 'module' and 'unit or portion' were used for facilitation of the detailed description of the present invention. Therefore, the suffixes do not have different meanings from each other.

The mobile terminal according to the present invention may include a smart phone, a laptop computer, a digital broadcasting terminal, a Personal Digital Assistant (PDA), a Portable Multimedia Player (PMP), an E-book, a navigation system, etc.

Figure 1:
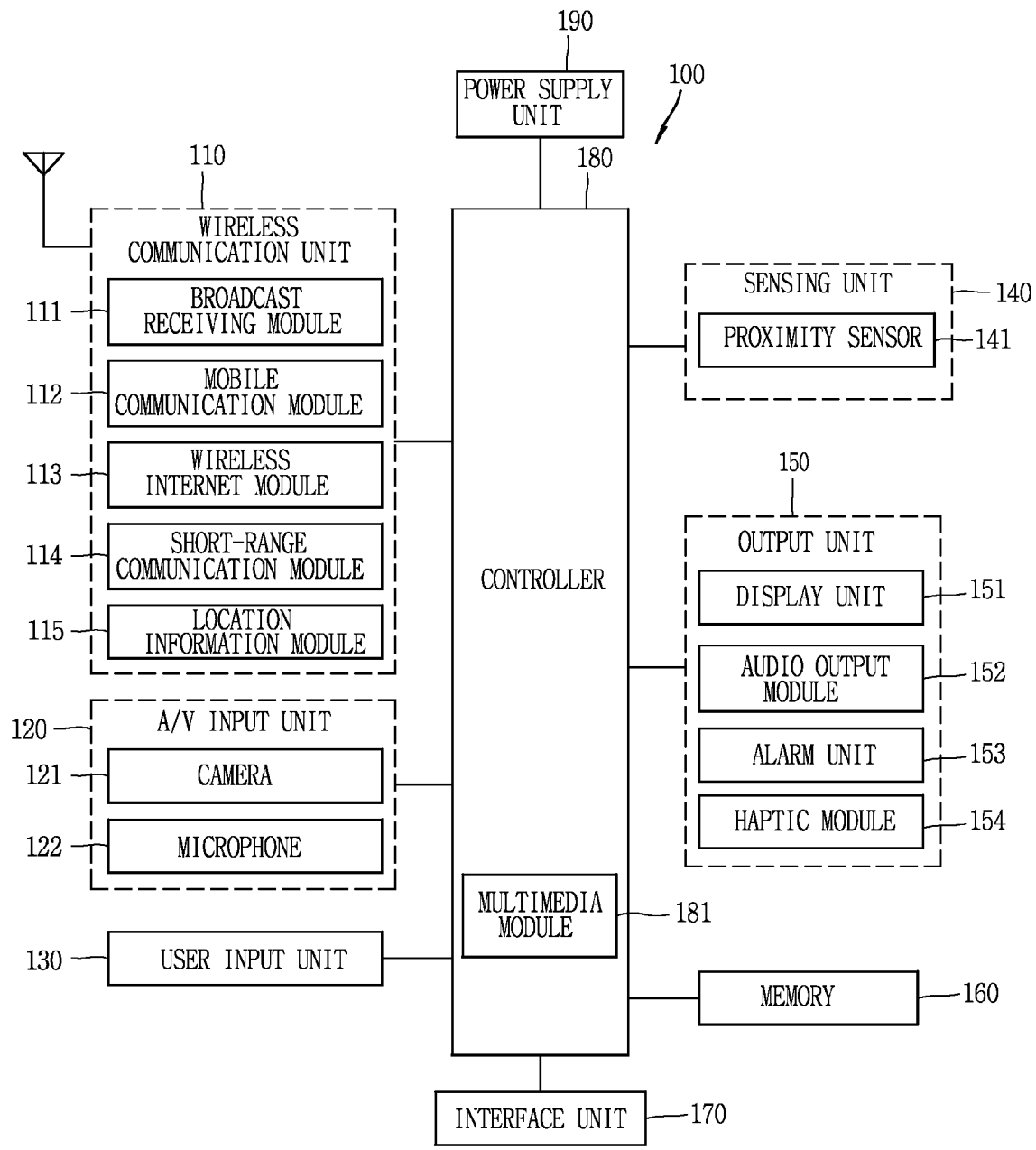
FIG. 1 is a block diagram of a mobile terminal according to one embodiment of the present invention.

FIG. 1 is a block diagram of a mobile terminal 100 according to an embodiment of the present invention.

As shown in FIG. 1, the mobile terminal 100 includes a radio communication unit 110, an A/V (Audio/Video) input unit 120, a user input unit 130, a sensing unit 140, an output unit 150, a memory 160, an interface unit 170, a controller 180, and a power supply unit 190. FIG. 1 shows the mobile terminal 100 having various components, but it is understood that implementing all of the illustrated components is not a requirement. The mobile terminal 100 may be implemented by greater or fewer components.

Hereinafter, each of the above components will be explained.

The radio communication unit 110 typically includes one or more components to authorize radio communication between the mobile terminal 100 and a radio communication unit system or a network in which the mobile terminal 100 is located. For example, the radio communication unit 110 may include a broadcast receiving module 111, a mobile communication module 112, a wireless Internet module 113, a short range communication module 114, a location information module 115, etc.

The broadcast receiving module 111 receives broadcast signals and/or broadcast associated information from an external broadcast management server (or other network entity) via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

The broadcast associated information may refer to information associated with a broadcast channel, a broadcast program or a broadcast service provider. The broadcast associated information may also be provided via a mobile communication network. In this case, the broadcast associated information may be received by the mobile communication module 112.

The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcast signals and/or broadcast-associated information received via the broadcast receiving module 111 may be stored in the memory 160.

The mobile communication module 112 transmits and/or receives radio signals to and/or from at least one of a base station, an external terminal and a server. Such radio signals may include a voice call signal, a video call signal or various types of data according to text and/or multimedia message transmission and/or reception.

The wireless Internet module 113 supports wireless Internet access for the mobile communication terminal. This module may be internally or externally coupled to the mobile terminal 100. Here, as the wireless Internet technique, a wireless local area network (WLAN), Wi-Fi, wireless broadband (WiBro), world interoperability for microwave access (WiMAX), high speed downlink packet access (HSDPA), and the like, may be used.

The short range communication module 114 is a module for supporting short range communications. Some examples of short range communication technology include Bluetooth™, Radio Frequency IDentification (RFID), Infrared Data Association (IrDA), Ultra-WideBand (UWB), ZigBee™, Near Field Communication (NFC) and the like.

The location information module 115 is a module for acquiring a location (or position) of the mobile communication terminal. For example, the location information module 115 may include a GPS (Global Positioning System) module.

Referring to FIG. 1, the NV input unit 120 is configured to receive an audio or video signal. The NV input unit 120 may include a camera 121 and a microphone 122. The camera 121 processes image data of still pictures or video acquired by an image capture device in a video capturing mode or an image capturing mode. The processed image frames may be displayed on a display 151.

The image frames processed by the camera 121 may be stored in the memory 160 or transmitted via the radio communication unit 110. Two or more cameras 121 may be provided according to the configuration of the mobile communication terminal.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate key input data from commands entered by a user to control various operations of the mobile communication terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like.

The sensing unit 140 detects a current status (or state) of the mobile terminal 100 such as an opened or closed state of the mobile terminal 100, a location of the mobile terminal 100, the presence or absence of a user's touch (contact) with the mobile terminal 100 (e.g., touch inputs), the orientation of the mobile terminal 100, an acceleration or deceleration motion and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or no the interface unit 170 is coupled with an external device. The sensing unit 140 may include a proximity sensor 141.

The output unit 150 is configured to provide outputs in a visual, audible, and/or tactile manner (e.g., audio signal, video signal, alarm signal, vibration signal, etc.). The output unit 150 may include the display 151, an audio output unit 152, an alarm unit 153, a haptic module 154, and the like.

The display 151 may display information processed in the mobile terminal 100. For example, when the mobile terminal 100 is in a phone call mode, the display 151 may display a User Interface (UI) or a Graphic User Interface (GUI) associated with a call. When the mobile terminal 100 is in a video call mode or image capturing mode, the display 151 may display a captured image and/or received image, a UI or GUI.

The display 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of these displays may be configured to be transparent so that outside may be seen therethrough, which may be referred to as a transparent display. A representative example of this transparent display may include a transparent organic light emitting diode (TOLED), etc. The mobile terminal 100 may include two or more displays 151. The rear surface portion of the display 151 may also be implemented to be optically transparent. Under this configuration, a user can view an object positioned at a rear side of a body through a region occupied by the display 151 of the body.

The display 151 may be implemented in two or more in number according to a configured aspect of the mobile terminal 100. For instance, a plurality of displays may be arranged on one surface integrally or separately, or may be arranged on different surfaces.

Here, if the display 151 and a touch sensitive sensor (referred to as a touch sensor) have a layered structure therebetween, the structure may be referred to as a touch screen. The display 151 may be used as an input device rather than an output device. The touch sensor may be implemented as a touch film, a touch sheet, a touch pad, and the like.

The touch sensor may be configured to convert changes of a pressure applied to a specific part of the display 151, or a capacitance occurring from a specific part of the display 151, into electric input signals. Also, the touch sensor may be configured to sense not only a touched position and a touched area of a touch object, but also a touch pressure.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display 151 has been touched.

Referring to FIG. 1, a proximity sensor 141 may be arranged at an inner region of the mobile terminal covered by the touch screen, or near the touch screen. The proximity sensor indicates a sensor to sense presence or absence of an object approaching to a surface to be sensed, or an object disposed near a surface to be sensed, by using an electromagnetic field or infrared rays without a mechanical contact. The proximity sensor has a longer lifespan and a more enhanced utility than a contact sensor.

The proximity sensor may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

In the following description, for the sake of brevity, recognition of the pointer positioned to be close to the touch screen without being contacted will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

The proximity sensor detects a proximity touch and a proximity touch pattern (e.g., a proximity touch distance, a proximity touch speed, a proximity touch time, a proximity touch position, a proximity touch motion state, or the like), and information corresponding to the sensed proximity touch operation and the proximity touch pattern can be output to the touch screen.

The audio output unit 152 may output audio data received from the radio communication unit 110 or stored in the memory 160 in a call signal reception mode, a call mode, a record mode, a voice recognition mode, a broadcast reception mode, and the like. Also, the audio output unit 152 may provide audible outputs related to a particular function (e.g., a call signal reception sound, a message reception sound, etc.) performed in the mobile terminal 100. The audio output unit 152 may include a receiver, a speaker, a buzzer, etc.

The alarm unit 153 outputs a signal for informing about an occurrence of an event of the mobile terminal 100. Events generated in the mobile terminal may include call signal reception, message reception, key signal inputs, and the like. In addition to video or audio signals, the alarm unit 153 may output signals in a different manner, for example, to inform about an occurrence of an event. For example, the alarm unit 153 may output a signal in the form of vibration. The video signal or audio signal may be output through the display 151 or the audio output unit 152. Therefore, the display 151 and the audio output unit 152 may be categorized as part of the alarm unit 153.

The haptic module 154 generates various tactile effects the user may feel. A typical example of the tactile effects generated by the haptic module 154 is vibration. The strength and pattern of the haptic module 154 can be controlled. For example, different vibrations may be combined to be output or sequentially output.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

The memory 160 may store software programs used for the processing and controlling operations performed by the controller 180, or may temporarily store data (e.g., a map data, phonebook, messages, still images, video, etc.) that are input or output. The memory 160 may store data relating to various patterns of vibrations and sounds output when touch input to the touch screen is sensed.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

Here, the identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via the interface unit 170.

When the mobile terminal 100 is connected with an external cradle, the interface unit 170 may serve as a passage to allow power from the cradle to be supplied therethrough to the mobile terminal 100 or may serve as a passage to allow various command signals input by the user from the cradle to be transferred to the mobile terminal therethrough. Various command signals or power input from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

The power supply unit 190 receives external power or internal power and supplies appropriate power required for operating respective elements and components under control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

The user input unit 130 will be explained in more detail. In the present invention, the user input unit 130 is disposed on a rear surface of the mobile terminal so that a front display can have a large screen. Hereinafter, a structure where the user input unit 130 is disposed on the rear surface of the mobile terminal, and an operation of the mobile terminal will be explained.

Figure 2A:
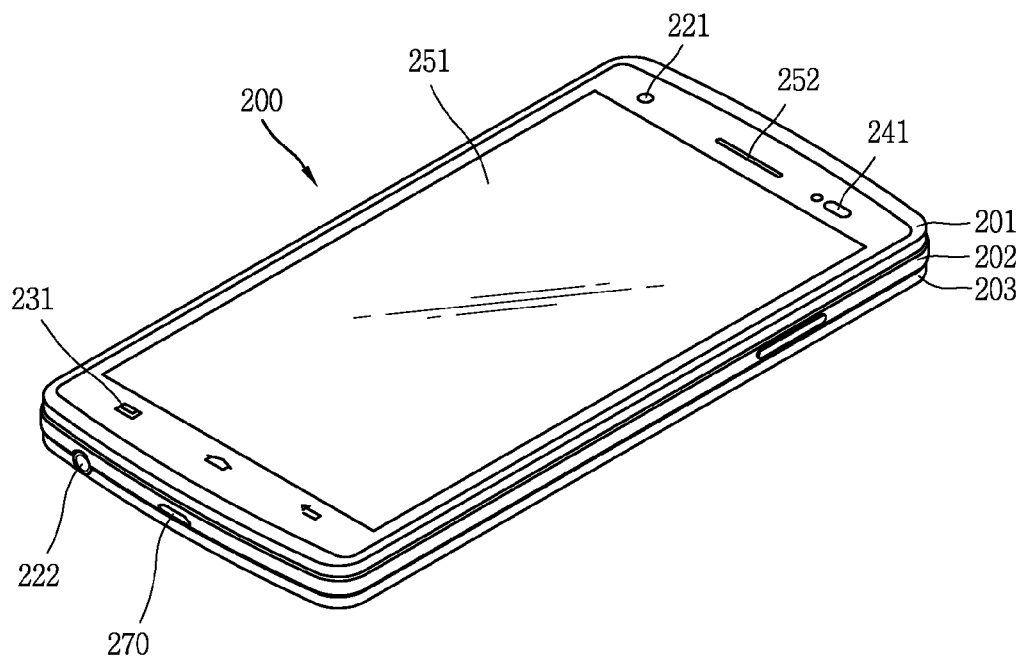
FIGS. 2A and 2B are perspective diagrams of a front surface and a rear surface of the mobile terminal according to one embodiment of the present invention.
Figure 2B:
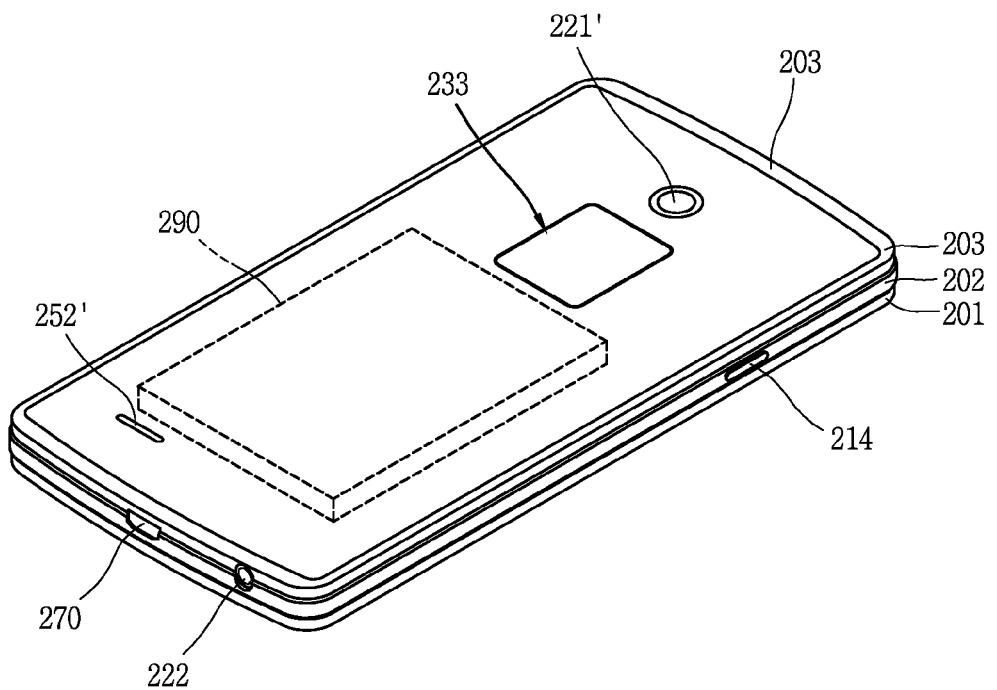

FIG. 2A is a front perspective view of a mobile terminal 200 according to the present invention, and FIG. 2B is a rear perspective view of the mobile terminal 200 of FIG. 2A.

The mobile terminal 200 is a bar type mobile terminal. However, the present invention is not limited to this, but may be applied to a slide type in which two or more bodies are coupled to each other so as to perform a relative motion, a folder type, or a swing type, a swivel type and the like.

A case (casing, housing, cover, etc.) forming an outer appearance of a body may include a front case 201, a rear case 202 and a battery cover 203. A space formed by the front case 201 and the rear case 202 may accommodate various components therein. At least one intermediate case may further be disposed between the front case 201 and the rear case 202.

Such cases may be formed by injection-molded synthetic resin, or may be formed using a metallic material such as stainless steel (STS) or titanium (Ti).

At the front case 201, may be disposed a display unit 251, an audio output unit 252, a camera 221, etc. On side surfaces of the front case 201 and the rear case 202, may be disposed a microphone 222, a side input unit 232, an interface unit 270, etc.

The display unit 251 occupies most parts of a main surface of the front case 201. That is, the display unit 251 is disposed on a front surface of the terminal body, and outputs visual information. The audio output unit 252 and the camera 221 are arranged at a region adjacent to one end of the display unit 251, and a front input unit 231 is arranged at a region adjacent to another end of the display unit 251.

The front input unit 231 is configured as an example of the user input unit 130 (refer to FIG. 1), and may include a plurality of manipulation units. The manipulation units may be referred to as manipulating portions, and may include any type of ones that can be manipulated in a user's tactile manner. In the present invention, the front input unit 231 is configured as a touch key. However, the present invention is not limited to this. That is, a push key may be added to the front input unit 231.

The display unit 251 may form a touch screen together with a touch sensor. In this case, the touch screen may be the user input unit 130. Under such configuration, the front surface of the mobile terminal may not be provided with the front input unit 231. In this case, the mobile terminal 200 may be configured so that inputs can be applied to the display unit 251 and a rear input unit 233 to be explained later.

A side input unit 232, another example of the user input unit 130 may receive various commands, e.g., a command for controlling a level of sound outputted from the audio output unit 252, or a command for converting the current mode of the display unit 251 to a touch recognition mode.

Referring to FIG. 2B, a camera 221' may be additionally provided on the rear case 202. The camera 221' faces a direction which is opposite to a direction faced by the camera 221 (refer to FIG. 2A), and may have different pixels from those of the camera 221.

For example, the camera 221 may operate with relatively lower pixels (lower resolution). Thus, the camera 221 may be useful when a user can capture his face and send it to another party during a video call or the like. On the other hand, the camera 221' may operate with a relatively higher pixels (higher resolution) such that it can be useful for a user to obtain higher quality pictures for later use. The cameras 221 and 221' may be installed at the terminal body so as to rotate or pop-up.

A flash 223 and a mirror (not shown) may be additionally disposed close to the camera 221'. The flash 223 operates in conjunction with the camera 221' when taking a picture using the camera 221'. The mirror can cooperate with the camera 221' to allow a user to photograph himself in a self-portrait mode.

An audio output unit 252' may be additionally arranged on a rear surface of the terminal body. The audio output unit 252' may cooperate with the audio output unit 252 (refer to FIG. 2A) disposed on a front surface of the terminal body so as to implement a stereo function. Also, the audio output unit 252' may be configured to operate as a speakerphone.

A power supply unit 290 for supplying power to the mobile terminal 200 is mounted to the body. The power supply unit 290 may be mounted in the body, or may be detachably mounted to the body.

As illustrated, a rear input unit 233 is arranged on the rear surface of the mobile terminal body. The rear input unit 233 is positioned, for example, adjacent to the camera module 221'.

The rear input unit 233 operates in such a manner that a command for controlling operation of the mobile terminal 200 is input into it. Various contents are set to be input into the rear input unit 233. For example, the commands, such as powering-on/off, starting, terminating, and scrolling, and the commands, such as adjusting an amount of sound being output from the audio output module 252 or 252', and switching of the display module 251 to a touch recognition mode are input into the rear input unit 233.

In addition, the rear input unit 233 according to the present invention is realized as one on which rotational operation can be performed. In addition, the rear input unit 233 according to the present invention includes the touch sensor described above and is realized as one to which "proximity touch" can be applied. In addition, the rear input unit 233 according to the present invention includes multiple keys. In this case, the multiple keys are configured in different shapes in such a manner that they are identified through a tactile impression obtained with a user's finger.

Furthermore, the rear input unit 233 according to the present invention includes a frame, and a wheel key, a window, and the like that are mounted on the frame. In this case, the frame (not illustrated) is mounted on a case of the mobile terminal body, for example, on a rear case 202, as illustrated. In addition, the wheel key (not illustrated) is mounted on the frame and is formed in such a manner that it is exposed to the outside through a predetermined through hole in the rear surface. As described above, visual information being output from the display unit 251 is formed in such a manner that it is changed according to an operation of rotating the wheel key. In addition, the window is configured in such a manner that comparatively-simple visual information is output such as a watch, an alarm, weather information, status information, or an alert. The window is also formed in such a manner that the visual information being output is changed according to the operation of the rear input unit 233.

In addition, of course, the rear input unit 233 is applied to the mobile terminal that has the display unit and the touch on each of the front and rear surfaces of the body thereof. Each display unit is configured from a transparent display, a three-dimensional display, a flexible display, or combinations of them.

A user interface that uses the rear input unit 233 that is configured in this manner and is arranged on the rear surface of the mobile terminal is disclosed in the present specification.

In addition, in the mobile terminal 100 that is capable of including at least one or more of the constituent elements described above, the use of the rear input unit 233 described above enables fast, easy access to an application being executing on a lower layer of the display unit 151 without a layer change. Furthermore, a user environment is provided in which the control command can be input.

In the related art, in order to execute multi-tasking on one screen, an application in a lower layer is selected and activated to execute another task while one task is executed using an application being executing on a higher layer, and then the existing application being executing on the higher layer is selected back and activated to execute the one task. This causes inconvenience. In addition, an indication position of the application being executed on the higher or lower layer for the task desired is changed. This causes a disadvantage of decreasing an efficiency of multi-tasking. In addition, to solve these problems, a multi touch and the like are used for easier access to the multiple layers. However, there is a limit to the number of layers, an application on each of which is executed.

Accordingly, the mobile terminal 100 disclosed in the present specification is configured to include the display unit 151 that is arranged on the front surface of the mobile terminal and is formed in such a manner that the visual information corresponding to each of the multiple layers is displayed on the front surface, and the user input unit 130 that includes a front-surface input unit that is arranged on the front surface of the mobile terminal and a rear input unit that is arranged on the rear surface of the mobile terminal and is formed in such a manner that the control command is input into the rear input unit. When an input is applied to the front-surface input unit of the display unit 151, the controller 180 of the mobile terminal with this configuration applies a function corresponding to the input applied to the front-surface input unit to first visual information that is displayed on a first layer (for example, an uppermost layer) of the display unit 151. Then, when the input is applied to the rear input unit of the display unit 151, the controller 180 of the mobile terminal maintains without any change a state in which the first visual information is displayed on the first layer and at the same time activates a second layer (for example, the lowermost layer) arranged under the first layer. That is, the quick access to the lower layer is possible without selecting the second layer or changing the indication position.

A method of controlling the lower layer of the display unit 151 using the rear input unit 233 described above without converting the layer according to one embodiment of the present invention is described in detail below referring to FIG. 3 and FIGS. 4A and 4B.

FIG. 3 is an exemplary flowchart of the method of controlling each of the applications being executed on the multiple layers in the mobile terminal according to one embodiment of the present invention. FIGS. 4A and 4B are diagrams for describing the flowchart in FIG. 3.

First, referring to FIG. 3, the visual information corresponding to each of the multiple layers is displayed on the display unit 151 of the mobile terminal 100 according to the embodiment of the present invention (S310).

At this point, there is no limit to the visual information corresponding to each of the multiple layers. For example, the visual information being displayed on the lower layer of the display unit 151 is a waiting screen or an execution screen of an application that is previously (or first) executed. In addition, the visual information being displayed on the higher is the execution screen of an application that is later (or, most recently) executed.

If the visual information corresponding to each of the multiple layers is displayed in this manner on the display unit 151, in response to the application of the input to the front-surface input unit 231 and/or 252) of the mobile terminal, the controller 180 applies a function corresponding to the input to the first visual information that is displayed on the first layer of the display unit 151 (S320).

At this point, the front-surface input unit 231 and/or 251 includes an input unit that is provided on a bezel portion arranged on the front surface of the mobile terminal and, as described below, the front-surface input unit 231 and/or 251 and the display unit 151 are integrated into a touch screen.

In addition, at this point, the first visual information is a screen corresponding to a first application that is currently executed on the uppermost layer of the display unit 151. For example, if the first application is an application with a QSLIDE (a registered trademark of LGE) function, the first visual information is a moving image screen that is output in the form of a floating window to the display unit 151.

On the other hand, in response to the application of the input to the rear input unit 233 of the mobile terminal, the controller 180 activates the second layer being arranged under the first layer while maintaining a state in where the first visual information is displayed on the first layer (S330). In this case, a display change in a second visual information being displayed on the second layer, which corresponds to the activation, may be output on or may not be output on the display unit 151.

In addition, at this point, the input into the rear input unit 233 is a predetermined-type touch input or a push input. For example, if the rear input unit 233 includes a touch pad, the input is a "tap" input in which light tapping is performed on the touch pad.

Figure 4A:
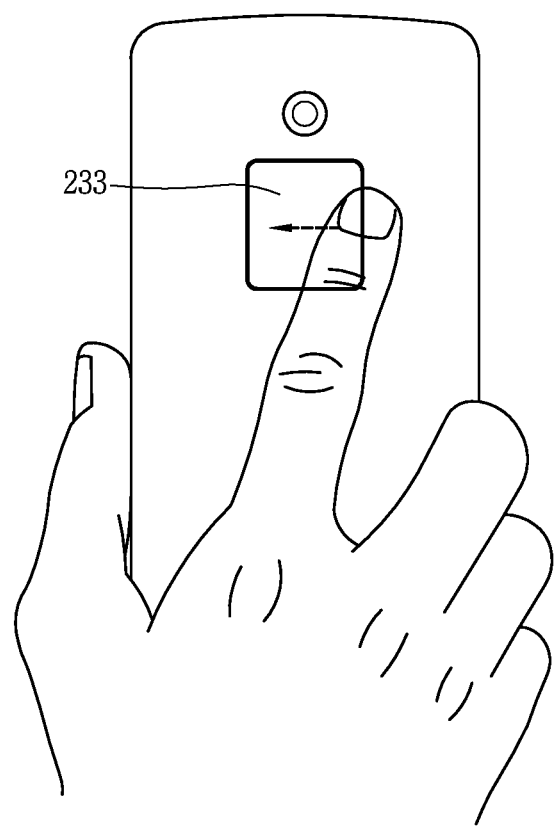
FIGS. 4A and 4B are diagrams for describing the flowchart in FIG. 3.

For example, if a drag touch, as illustrated in FIG. 4A, is input, in one direction, into a touch sensor 233 provided on the rear surface of the mobile terminal, the access to and the operating of the lowermost layer of the front-surface display unit 151 of the mobile terminal is possible as described in more detail below.

In addition, at this point, the second visual information is a screen corresponding to a second application that is executed on the lowermost layer of the display unit 151. For example, if the second application is an application corresponding to the waiting screen, the second visual information is a waiting screen that includes multiple application icons as an object.

In addition, at this point, the maintaining of the state in which the first visual information is displayed on the first layer means that no display change (for example, transparency, brightness, a highlighting effect, or the like) occurs in the first visual information while the second layer is activated through the operation with respect to the rear input unit 233. For example, if a YouTube moving image is output to the first layer, by operating the rear input unit 233, the user can have the access (or the activation of) to the second layer positioned under the first layer without the YouTube moving image being covered with his/her hand and the like while continuing to view the YouTube moving image.

Subsequently, in a state where the second layer is activated, when it is detected that the input is applied to the rear input unit 233 and then an input-applied area is flicked in one direction (S340), the controller 180 switches the second visual information being displayed on the second layer to third visual information corresponding to the one direction or moving an object included in the second visual information toward the one direction, while maintaining the state in which the first visual information is displayed on the first layer (S350).

At this point, the "flicking" means an operation in which the touch is applied to the rear input unit 233 and then a touch-applied area is pushed with a user's finger in the same manner that turns over a page.

In addition, the third visual information is a screen corresponding to an application that is executed on the same layer as the second visual information. In addition, the second visual information is the waiting screen, the third visual information is a different waiting screen corresponding to the second visual information. For example, if a web application configured from multiple web pages is executed on the second layer, the second visual information and the third visual information are different web pages.

In addition, an object included in the second visual information means all images or all texts that are included in the application that is executed on the second layer. For example, the object includes an icon for executing a specific application included in the second visual information, a context menu for controlling the second visual information, and the like.

Figure 4B:
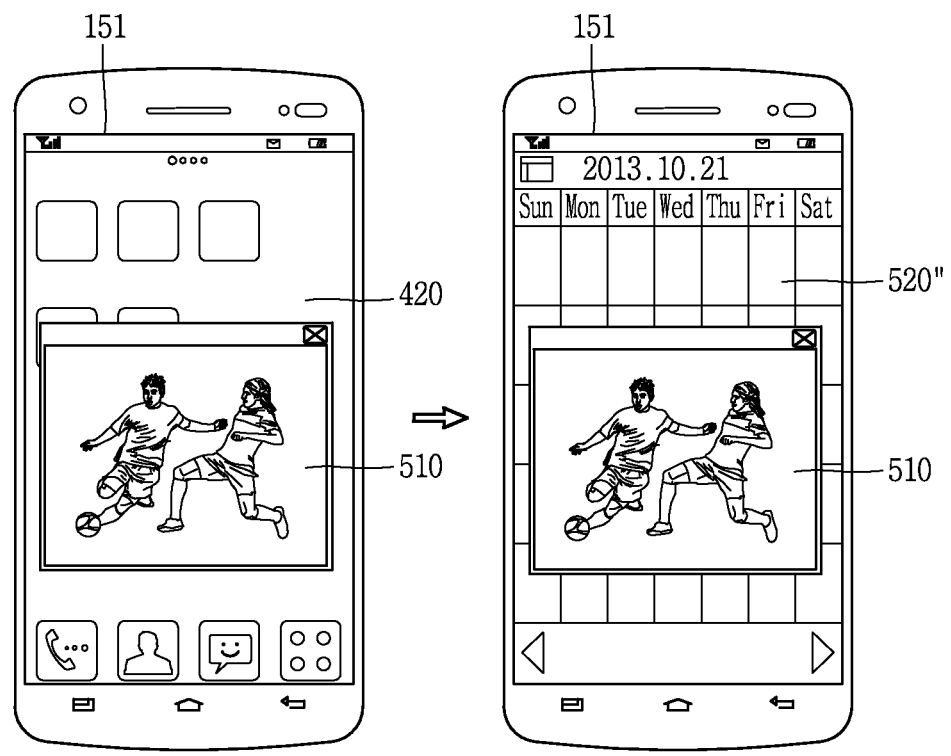

For example, if the user, as illustrated in FIG. 4A, performs drag touch input on the rear input unit 233 in one direction (for example, in the right-to-left direction), while a state of a moving image screen 410 that is currently output to the uppermost layer of the display unit 151 is maintained, a waiting screen 420 being displayed on the lowermost layer of the display unit 151, as illustrated in FIG. 4B, is screen-switched along the direction of the touch input, that is, screen-switched to a different waiting screen 420" positioned in the leftward rotation direction. At this point, while the waiting screen 420 is switched and thereafter, a state also is maintained in which the waiting screen being displayed on the lowermost layer is screen-covered with the moving image screen 410 being output to the uppermost layer. On the other hand, while the waiting screen being displayed on the lowermost layer is changed by a user operation, the user can continuously maintain the viewing without the display change in the moving image screen 410 being displayed on the uppermost layer or without the screen being covered.

In addition, for example, if the input applied to the rear input unit 233 is recognized as "selection" of a specific object included in the second visual information, a specific icon selected is moved to a point at which the drag touch input is terminated, in the waiting screen 420 being displayed on the lowermost layer of the display unit 151 in FIG. 4B.

On the other hand, in this manner, if the input into the rear-screen input unit 233 is interrupted (for example, a touch-up) and it is detected that the input is applied to the front-surface input unit 231 and/or 251 while the state in which the first visual information is displayed on the first layer is maintained and at the same time a state of display on the second layer is controlled, the controller 180 activates back the first layer while maintaining a state in which the second visual information is displayed on the second layer.

That is, the user's fast access to or the user's fast departure from each of the higher layer and the lower layer is possible while maintaining the state of display on each of the multiple layers of the display unit 151. Then, accordingly, if the input unit being arranged in the "front surface" of the mobile terminal is operated, the "higher" layer of the display unit 151 is controlled, and if the input unit being arranged in the "rear surface" of the mobile terminal is operated, the "lower" layer of the display unit 151 is controlled. This provides the user with an intuitive-interface environment.

As described above, the mobile terminal according to the embodiment of the present invention provides a convenient user interface environment in which the state of the application being executed on the higher layer of the display unit is maintained using the user input unit provided on the rear surface of the mobile terminal body and at the same time the application being executed on the lower layer of the display unit is controlled without covering the execution screen of the application being executed on the higher layer.

Figure 5A:
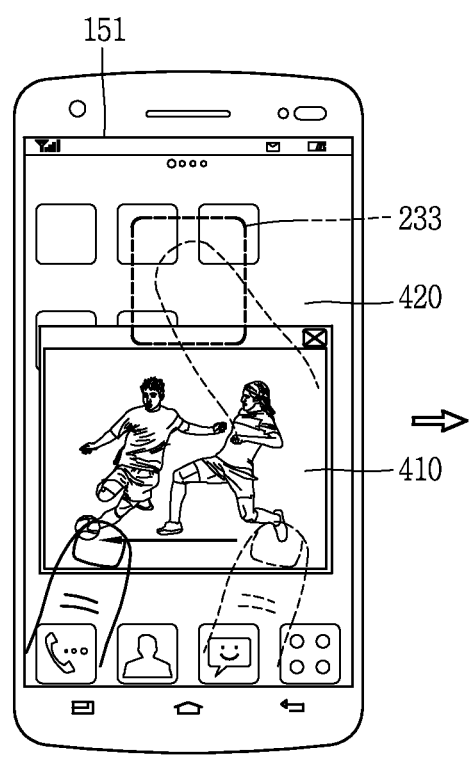
FIGS. 5A to 5C are diagrams for describing a method of controlling the applications that are executed on the multiple layers, respectively, using a user input unit provided on a rear surface of a mobile terminal body and a touch screen in the mobile terminal according to one embodiment of the present invention.
Figure 5B:
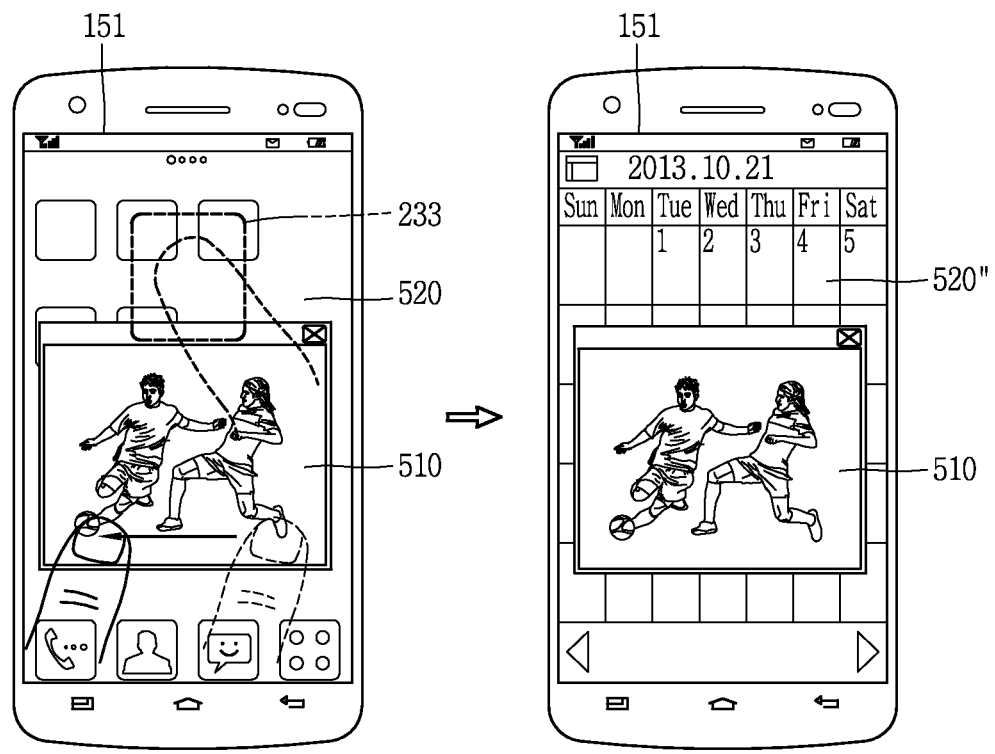
Figure 5C:
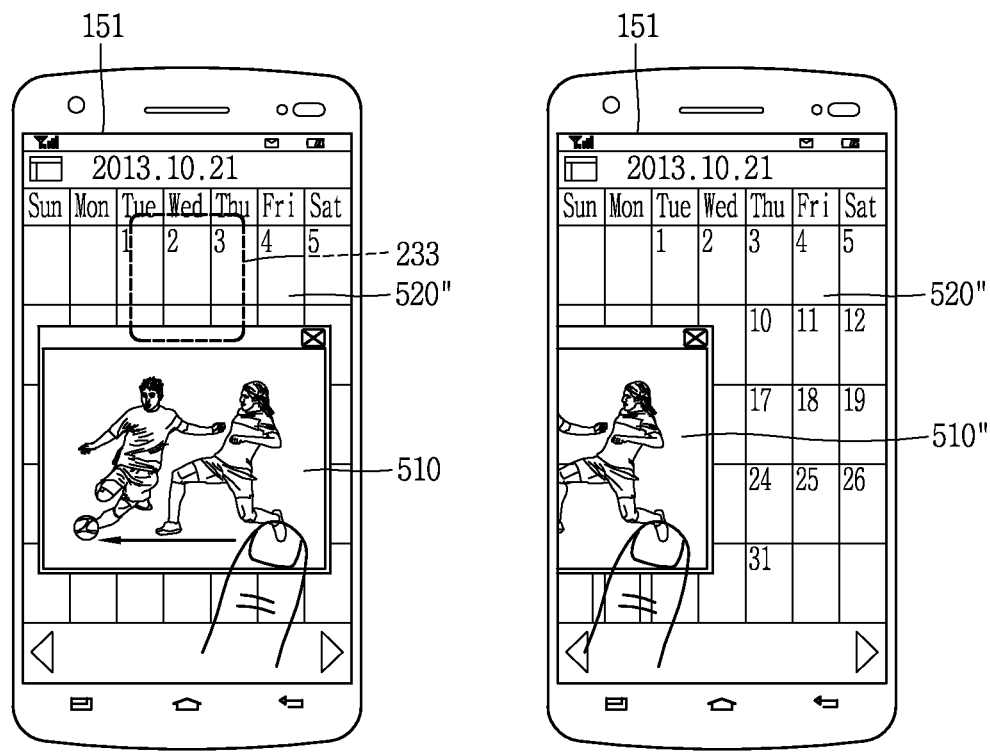

FIGS. 5A to 5C are diagrams for describing a method of controlling applications being executed on the multiple layers using the rear input unit 233 provided in the rear surface of the mobile terminal body and the touch screen in the mobile terminal according to one embodiment of the present invention.

At this point, an integration of the front-surface input unit described above and the display unit 151 into the touch screen according to the embodiment is described is below, First, the visual information corresponding to each of the multiple layers is displayed on the display unit 151 that is arranged on the front surface of the mobile terminal 100. At this point, as described above, there is no limit to the visual information corresponding to each of the multiple layers.

If the visual information corresponding to each of the multiple layers is displayed in this manner on the display unit 151, in response to the application of the touch input to the touch screen 251, the controller 180 applies a function corresponding to the touch input to the first visual information that is displayed on the first layer of the display unit 251. For example, if the first visual information is a specific web page screen corresponding to the web application, a scroll function is applied to the specific web page screen according to the drag direction of the touch input.

On the other hand, the controller 180 detects that in a state in which the input is applied to the rear input unit 233, a flicking touch input in one direction is applied to the touch screen. For example, as illustrated in FIG. 5A, while maintaining his/her one finger's tactile contact with the rear input unit 233 with the front surface of the mobile terminal toward him/her, the user can apply the flicking touch input to the front-surface display unit 151 with his/her different finger.

In this manner, when it is detected that the input is applied to the rear-screen input unit 233 and at the same time it is detected that the flicking touch input is applied to the touch screen, the controller 180 switches the second visual information being displayed on the second layer to the third visual information corresponding to the one direction or movies the object included in the second visual information in one direction while maintaining the state in which the first visual information is displayed on the first layer (that is, in the uppermost layer)

For example, referring to FIG. 5B, if a moving image screen 510 is output, in the form of a floating window, to the first layer of the display unit 151 and a waiting screen 520 is displayed on the second layer, when in a state in which the touch input is applied to the rear input unit 233, the flicking touch input is applied in one direction including the direction of a region to which the moving image screen 510 is output, only the waiting screen is switched to a different waiting screen 520" corresponding to the flicking direction without any change corresponding to the touch input into the moving image screen 510.

On the other hand, if the input into the rear input unit 233 is terminated in this manner while maintaining the flicking touch input into the touch screen, the controller 180 performs control in such a manner that the second layer is inactivated back and the function corresponding to the flicking touch input is applied to the first visual information displayed on the first layer as before.

For example, referring to FIG. 5O, if in a state in which the flicking touch input, as illustrated in FIG. 5B, is applied in one direction including the direction of the region to which the moving image screen 510 is output, the touch input applied to the rear screen input unit 233 becomes the touch-up, the moving image screen that is output in the form of a floating window is moved to a region corresponding to the flicking direction without any display change in the waiting screen 520" (520).

If the rear input unit 233 and the touch screen are operated in conjunction with each other, not only the access to and the operating of the lowermost layer are possible, but also a function of locking the operating of the uppermost layer is realized as possible.

Various methods of controlling an output range of an application being executed on the lower layer using a user input unit provided on the rear surface of the mobile terminal body according to the embodiment of the present invention are described below.

FIGS. 6A to 6D are diagrams for describing the method of controlling the output range of the application being executed on the lower layer using the user input unit provided on the rear surface of the mobile terminal body in the mobile terminal according to one embodiment of the present invention.

The rear input unit 233 disclosed in the present specification is arranged on the rear surface of the mobile terminal. The rear input unit 233, as described above, includes the touch sensor and/or multiple keys. Thus, various control commands can be input into the rear input unit 233. At this point, the inputting of the various control command is performed on the execution screen of the application being executed on the lowermost layer of the display unit 151. In addition, if the rear input unit 233 includes the multiple keys, the multiple keys are configured to take different shapes or to take different concave and convex shapes in such a manner that they are easily identified through a tactile impression obtained with a user's finger.

First, the visual information corresponding to each of the multiple layers is displayed on the display unit 151 of the mobile terminal 100 according to the embodiment of the present invention.

At this point, there is no limit to the visual information corresponding to each of the multiple layers.

If the visual information corresponding to each of the multiple layers is displayed in this manner on the display unit 151, in response to the application of the input to the rear input unit 233, the controller 180 activates the lowermost layer while maintaining the state of display on the uppermost layer of the display unit 151 (further including the states of display on the different layers except for the lowermost layer).

In a state where the lowermost layer is activated in this manner, the controller 180 recognizes various control command corresponding to the input being applied to the rear input unit 233.

As one example, in response to the rotation of the input applied to the rear input unit 233 in a first direction, the controller 180 decreases the output range of the second visual information being displayed on the second layer (that is, in the lowermost layer) while maintaining the state in which the first visual information is displayed on the first layer (that is, in the uppermost layer).

Figure 6A:
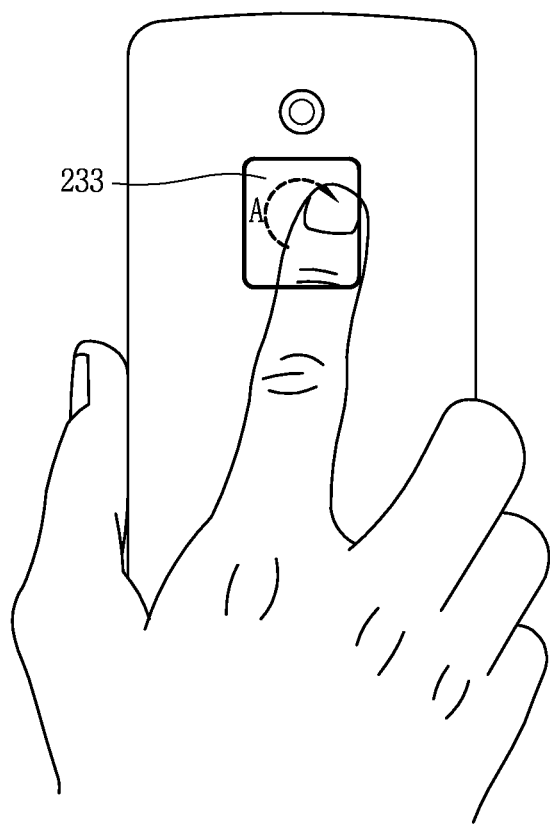
FIGS. 6A to 6D are diagrams for describing a method of controlling an output range of the application being executed in a lower layer using the user input unit provided on the rear surface of the mobile terminal body in the mobile terminal according to one embodiment of the present invention.
Figure 6B:
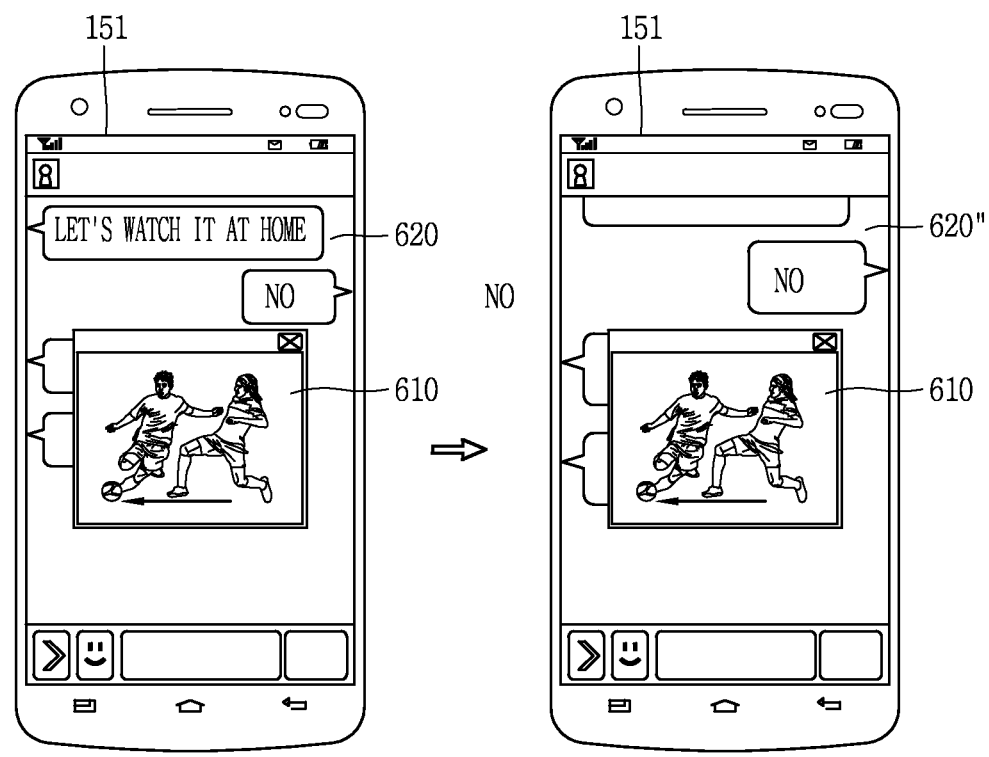

For example, in response to the rotation of the input applied to the rear input unit 233 in a direction A (for example, in the clockwise direction) in FIG. 6A, the output range of an execution screen 620 corresponding to an application with a message function that is displayed on the lowermost layer of the display unit 151 is decreased while maintaining an output state of a moving image screen 610 being displayed on the uppermost layer of the front-surface display unit 151 as illustrated in FIG. 6A (620"). That is, a text size of the execution screen of the application with the message function is increased. At this point, the controller 180 adjusts the extent to which the output range of the screen being displayed on the lowermost layer is decreased, in proportion to the extent to which the touch applied to the rear-screen input unit 233 is rotated.

In addition, in response to the rotation of the input applied to the rear input unit 233 in a second direction, the controller 180 increases the output range of the second visual information being displayed on the second layer (that is, in the lowermost layer) while maintaining the state in which the first visual information is displayed on the first layer (that is, in the uppermost layer).

Figure 6C:
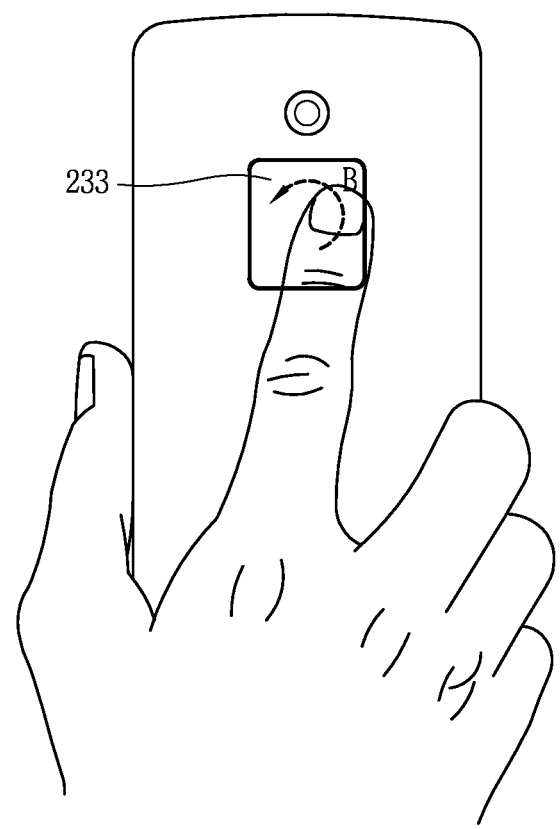
Figure 6D:
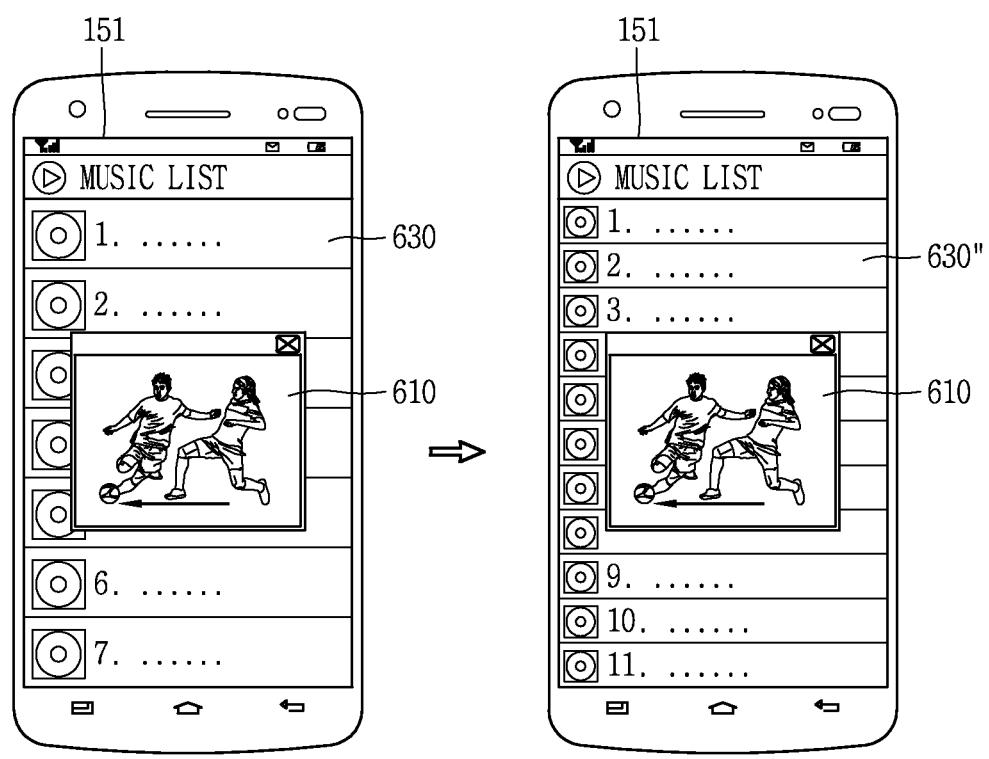

For example, in response to the rotation of the input applied to the rear input unit 233 in a direction B (for example, in the counterclockwise direction) in FIG. 6C, the output range of a list screen 630 corresponding to an application with a music listening function that is displayed on the lowermost layer of the display unit 151 is increased while maintaining the output state of a moving image screen 610 being displayed on the uppermost layer of the front-surface display unit 151 as illustrated in FIG. 6D (630"). That is, the number of items included in the list screen 630 is increased and the text size corresponding to each item is decreased. At this point, likewise, the controller 180 adjusts the extent to which the output range of the screen being displayed on the lowermost layer is increased, in proportion to the extent to which the touch applied to the rear-screen input unit 233 is rotated.

As another example, in response to the movement of at least two touch applied to the rear input unit 233 in one direction, the controller 180 changes the second visual information being displayed on the second layer (that is, in the lowermost layer) in such a manner that a desired range of the second visual information is output in the same manner as when a map search function is performed, while maintaining the state in which the first visual information is displayed on the first layer (that is, in the uppermost layer).

As another example, in response to the application of the input to a first key (for example, a "+" key) provided on the rear input unit 233, the controller 180 applies at least one function, among turning up a volume level, increasing the degree of brightness, turning up a channel number, and moving in the upward direction, to the second visual information being displayed on the second layer (that is, in the lowermost layer), while maintaining the state in which the first visual information is displayed on the first layer (that is, in the uppermost layer).

In addition, in response to the application of the input to a second key (for example, a "−" key) provided on the rear input unit 233, the controller 180 applies at least one function, among turning down a volume level, decreasing the degree of brightness, turning down a channel number, and moving in the downward direction, to the second visual information being displayed on the second layer (that is, in the lowermost layer), while maintaining the state in which the first visual information is displayed on the first layer (that is, in the uppermost layer).

At this point, according to the number of times that the input is applied to the first key or the second key, a level of a function applied is gradually changed. In addition, the display change corresponding to the function that is applied to the second visual information being in the second layer is visually displayed on one region of the display unit 151 (may be displayed on the second layer or may be displayed on a different layer).

In addition, in response to a predetermined number of times that the "tap" is applied to the rear input unit 233, the controller 180 outputs a point (not illustrated) to a point where the first visual information is not covered with the point, while maintaining the state in which the first visual information is displayed on the first layer (that is, the uppermost layer). The pointer that is output in this manner is continuously displayed on the second visual information that is displayed on the second layer (that is, the lowermost layer) of the display unit 151 along a moving path of the touch being applied to the rear input unit 233. The user selects a specific object included in the second visual information using the pointer or input a control command for performing a specific function into the object selected.

The methods of variously changing the screen being displayed on the lowermost layer of the display unit 151 according to various ways in which the input is applied to the rear input unit 233, according to the embodiment of the present invention, are described above.

A method of varying the layer being activated according to the order in which the input is applied to the front-surface input unit and the rear input unit, according to one embodiment of the present invention, is described below.

Figure 7:
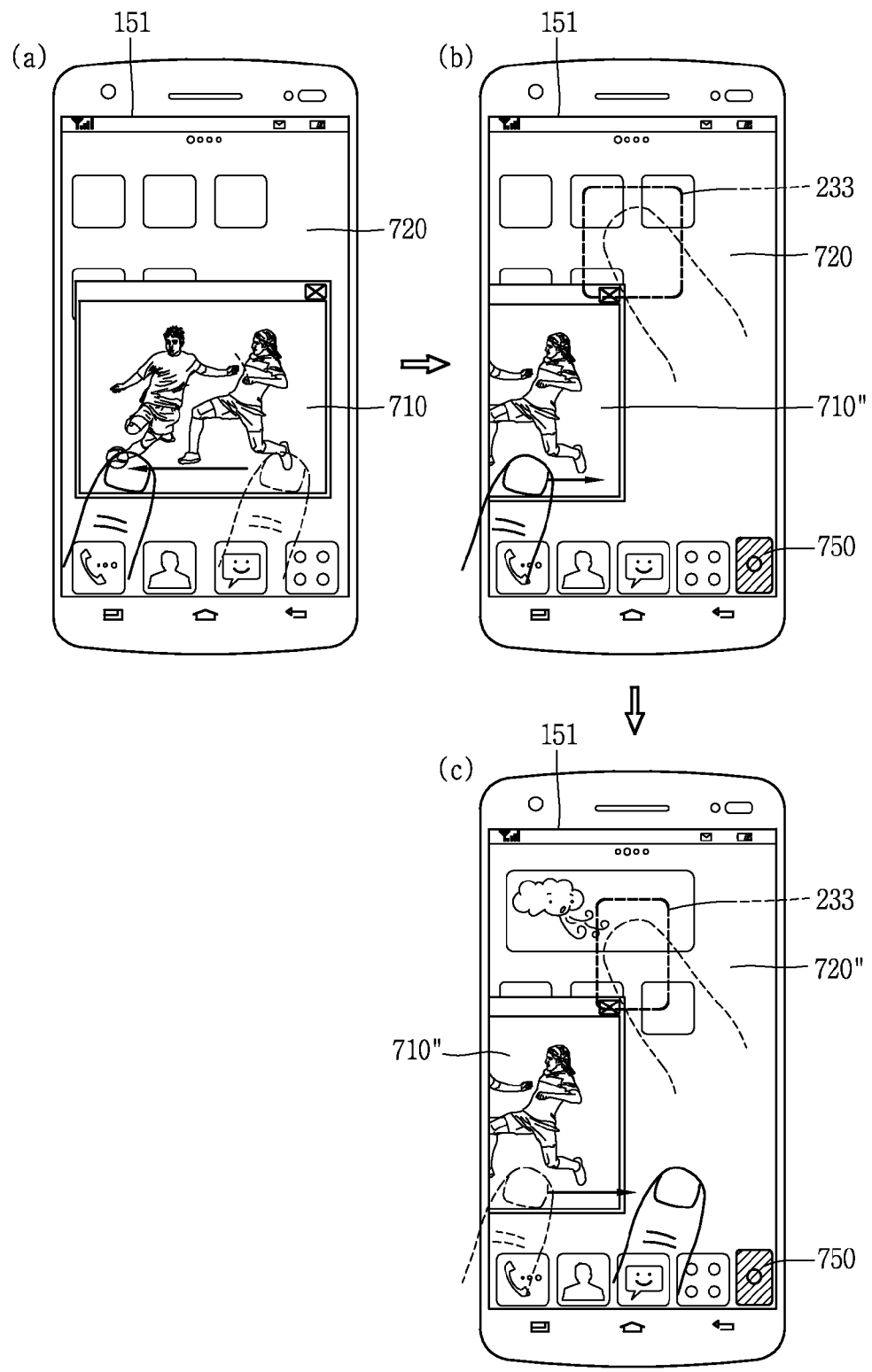
FIG. 7 is diagrams for describing a method of determining the layer being activated according to the order in which an input is applied to the user input units provided on a front surface and the rear surface of the mobile terminal body in the mobile terminal according to the embodiment of the present invention'

FIGS. 7A to 7C are diagrams for describing the method of determining the layer being activated according to the order in which the input is applied to the user input units provided on the front surface and the rear surface of the mobile terminal body in the mobile terminal according to one embodiment of the present invention.

Specifically, in a state in which the visual information corresponding to each of the multiple layers is displayed on the display unit 151 of the mobile terminal 100 according to the embodiment of the present invention, the controller 180 determines in a different manner whether or not the first layer (that is, the uppermost layer) of the display unit 151 is activated, according to the order in which the input is applied to the front-surface input unit (or the touch screen) and the rear input unit.

According to a first embodiment, in a state where the visual information corresponding to each of the multiple layers is displayed on the display unit 151, the controller 180 detects the flicking touch input in the first direction that is applied to the front-surface input unit (that is, the touch screen) that is formed as a result of being integrated with the display unit 151. Then, while a moving image screen 710 being displayed on the uppermost layer is moved according to the flicking touch input in the first direction, when it is detected that the input is applied to the rear input unit 233, the controller 180 activates the lowermost layer of the display unit 151 and at the same time inactivates the uppermost layer. That is, the display change to the uppermost layer is not made, but, thereafter, the inputting of the control command into the uppermost layer is limited.

For example, in a state where the moving image screen 710 is output, in the form of a floating window, on the layer corresponding to a waiting screen 720 in FIG. 7A, when the flicking touch input in one direction is applied to the moving image screen 710, the moving image screen 710 is moved in the direction of the corresponding flicking touch input as illustrated in FIG. 7B (710"). When it is detected, in this state, that the input is applied to the rear input unit 233 of the mobile terminal, a thumbnail image 750 corresponding to the input is displayed on one region, for example, a lower end region of the display unit 151. Thereafter, even though the flicking touch input is applied to a moving image screen 710″, the screen 710 is not moved and the waiting screen 720 displayed on the lower layer is screen-switched, as illustrated in FIG. 7C (720″).

According to a second embodiment, in a state where the visual information corresponding to each of the multiple layers is displayed on the display unit 151, the controller 180 detects the application of the input to the rear input unit 233. Then, in a state where the lowermost layer of the display unit 151 is activated according to the input into the rear input unit 233, if it is detected that the flicking input in the first direction is applied to the front-surface input unit (that is, the touch screen), the controller 180 executes the control command corresponding to the flicking touch input that is applied to at least a region of the first layer, which does not overlap the second layer. That is, the inputting of the control command into the uppermost layer is not limited.

On the other hand, if a touch event occurs on the rear input unit 233, the controller 180 displays a first icon corresponding to the touch event on one region of the display unit.

At this point, the first icon includes the visual system in whatever form, which indicates that the input is applied to the rear input unit. For example, as illustrated in FIGS. 7B and 7C, if the input is applied to the rear input unit 233, the thumbnail image 750 indicating the rear surface of the mobile terminal is output as the first icon.

In addition, a shape of the first icon is displayed in a visually different manner according to the way of the input applied to the rear-screen input unit or according to the control command corresponding to the input. For example, the first icon takes the shape of the second display unit displayed on which a touch line applied to the rear input unit is displayed or takes the shape of the OSD (on-screen display) thumbnail image corresponding to the control command.

In addition, if the first layer and the second layer are activated at the same time, that is, if the input into the rear input unit 233 does not limit the inputting of the control command into the first layer, the shape of the first icon is made not to be displayed on the display unit 151.

In a state where the first icon is displayed on the display unit 151 in this manner, when a touch-up event occurs on the rear input unit, the first icon is made to disappear from the display unit 151.

A specific example is described below in which a specific application is executed on the lower layer through the operating of the rear input unit 233 of the mobile terminal while maintaining the state of display on the higher layer.

Figure 8:
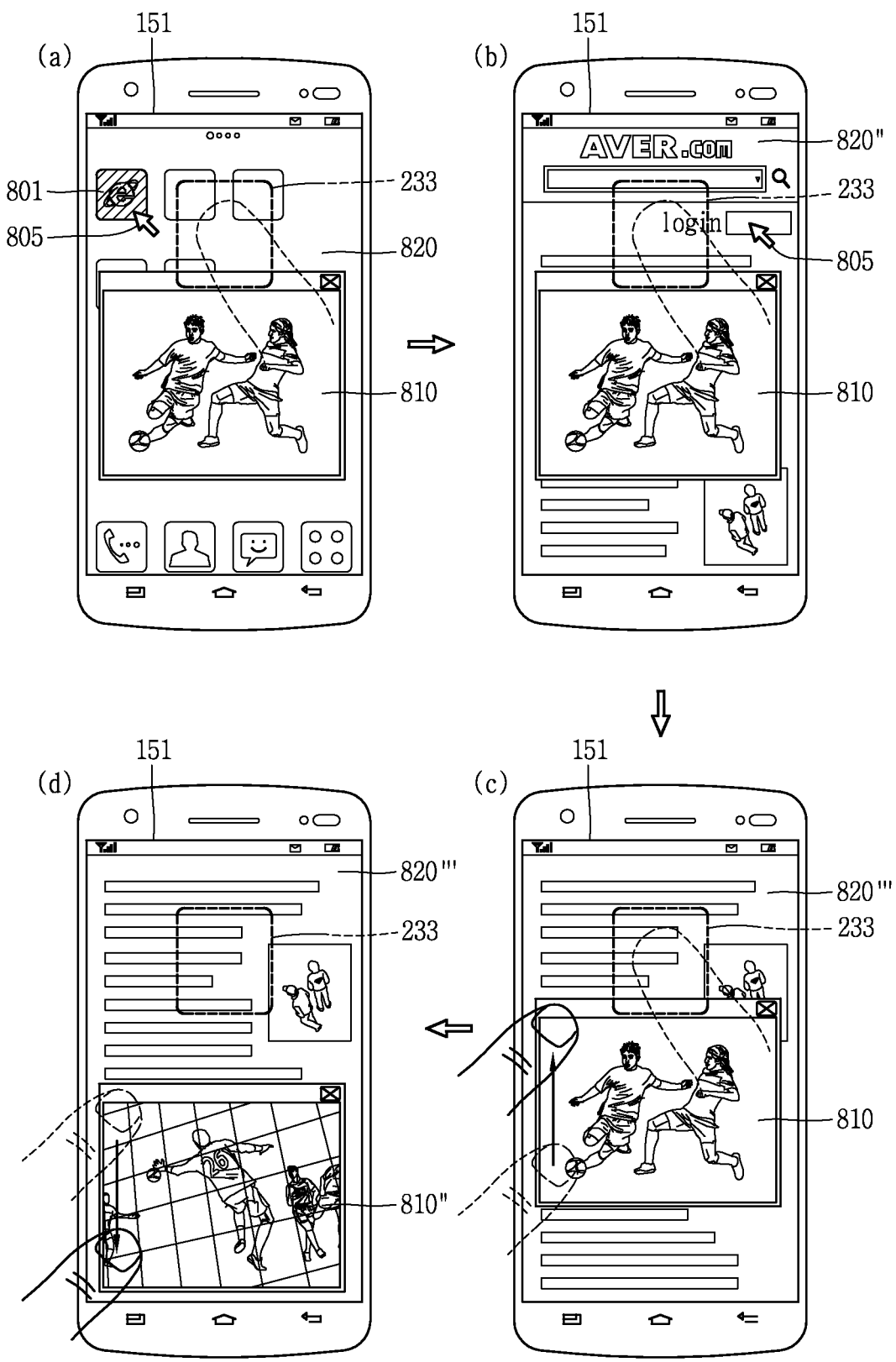
FIG. 8 is diagrams for describing a method of executing an application on the lower layer using the user input unit provided on the rear surface of the mobile terminal body in the mobile terminal according to one embodiment of the present invention.

FIG. 8 is diagrams for describing a specific method of executing an application on the lower layer using the user input unit provided on the rear surface of the mobile terminal body in the mobile terminal according to one embodiment of the present invention.

First, the visual information corresponding to each of the multiple layers is displayed on the display unit 151 of the mobile terminal 100 according to the embodiment of the present invention.

At this point, there is no limit to the visual information corresponding to each of the multiple layers.

In a state where the visual information corresponding to each of the multiple layers is output to the display unit 151 in this manner, the controller 180 detects that a first input and a second input are successively applied to the rear input unit.

In response to the successive application of the first and second inputs to the rear input unit 233 as described above, the controller 180 executes an application, associated with an object displayed on a region corresponding to the first input, on the second layer (that is, the lowermost layer) while maintaining the state in which the first visual information is displayed on the first layer (that is, the uppermost layer). That is, if a command for executing a specific application is applied to the second layer (that is, the lowermost layer) through the rear input unit 233, a screen corresponding to the execution of the corresponding application is output on the second layer (that is, the lowermost layer), not on the uppermost layer.

Specifically, in a state where a waiting screen 820 including icons of multiple applications is output to the second layer and a moving image screen 810 is output in the form of a floating window to the first layer in FIG. 8, when the user performs the first input (for example, a "tap" input) through the rear input unit 233, a pointer 805 is displayed on the second layer as illustrated in FIG. 8 (a). Then, the pointer 805 is moved to a specific object, that is, an icon 801 of a web application by dragging the first input applied to the rear input unit 233. Then, when the second input (for example, a "double tap" input) is applied through the rear input unit 233, an execution screen 820″ of the web application is displayed on the second layer as illustrated in FIG. 8 (b). That is, the second visual information being displayed on the second layer is switched to a web page screen 820″ on the waiting screen 820.

In this manner, in a state where a specific web page screen 820″ is displayed on the second layer, when the user drag-touches on the display unit 151 that is integrated with the front-surface input unit in one direction, for example, in the downward direction, content of the web page screen 820″ is scrolled along the dragging direction as illustrated in FIG. 8 (c) (820″″). At this point, in a state where the touch applied to the rear input unit 233 is released, when the display unit 151 is drag-touched in one direction as illustrated in FIG. 8 (c), the moving image screen 810 displayed on the first layer is moved in the dragging direction (810″).

As described above, the user can access and control an application that is executed on the uppermost layer of the front-surface display unit 151 of the mobile terminal and an application that is executed on the lowermost layer of the front-surface display unit 151 of the mobile terminal, in a fast, intuitive manner, using the rear input unit 233 and the front-surface input unit 231 and/or 251. Furthermore, the user can select whether a specific application is executed on the uppermost layer or on the lowermost layer. All of this provides the user with advantages.

Only the access of and the control of the application being executed on the lowermost layer of the display unit 151 using the rear input unit 233 are described above.

On the other hand, a method is described below in which the mobile terminal 100 disclosed in the present specification activates the multiple layers at the same time, upward from the lowermost layer, using the rear input unit 233.

Figure 9A:
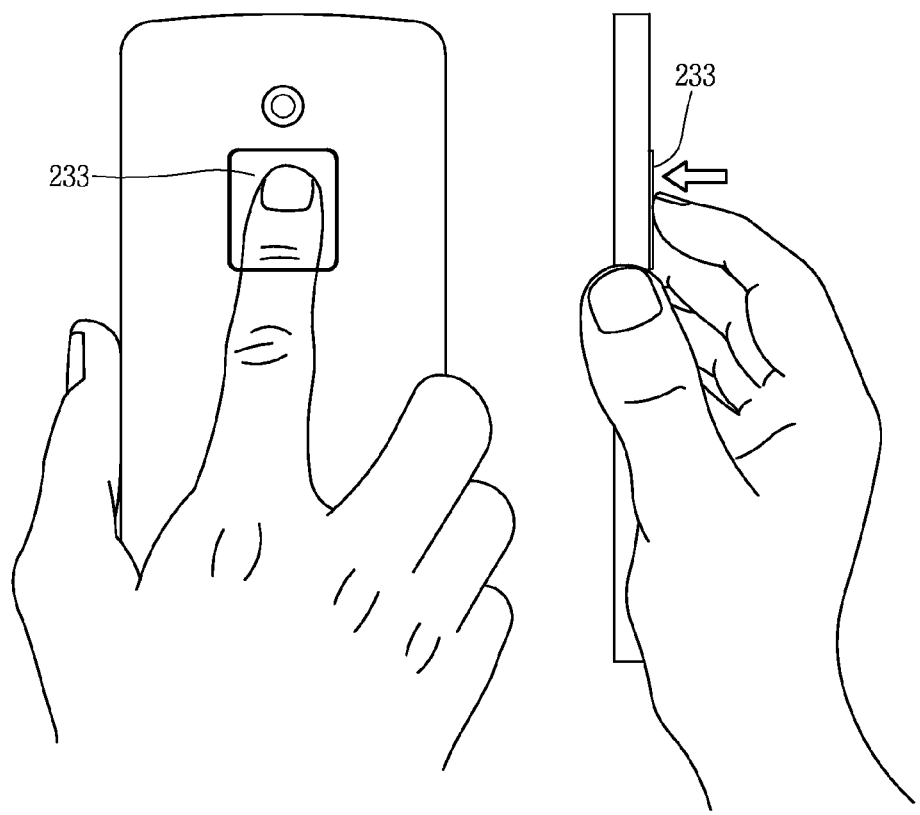
FIGS. 9A to 9B are diagrams for describing a method of determining the number of lower lasers being activated using the user input unit provided on the rear-surface of the mobile terminal body in the mobile terminal according to one embodiment of the present invention.
Figure 9B:
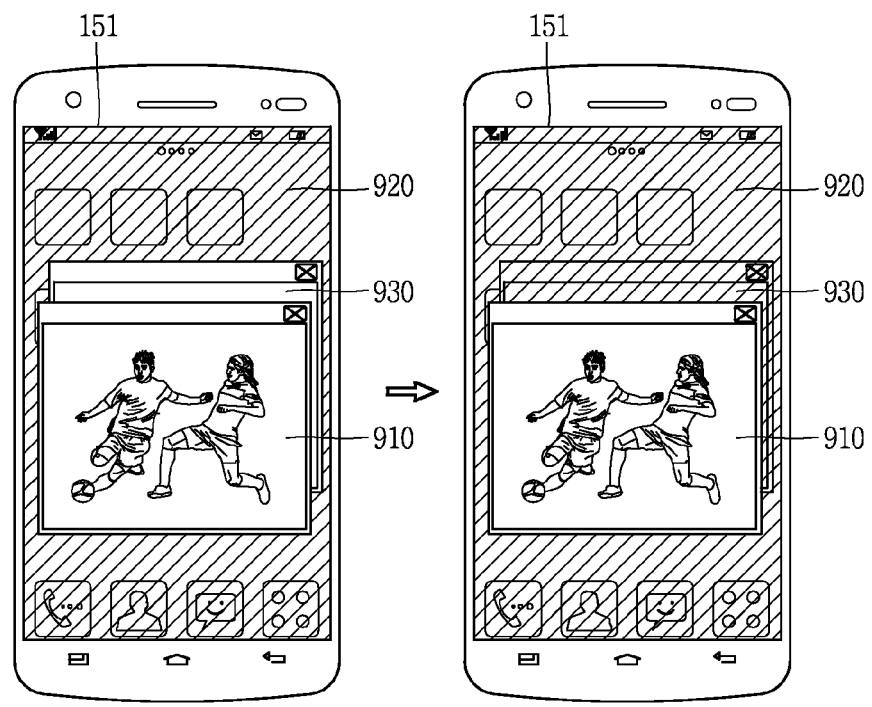

FIGS. 9A to 9B are diagrams for describing a specific method of determining the number of lower lasers being activated using the user input unit provided on the rear-surface of the mobile terminal body in the mobile terminal according to one embodiment of the present invention.

At this point, the rear input unit 233 is configured in such a manner that the touch input is applied to the rear input unit 233. Furthermore, the rear input unit 233 is formed in such a manner as to detect a point to which the touch is applied, a pressure (or strength) with which the touch is applied, and a speed at which the touch is applied.

To do this, the rear input unit 233 has, for example, a predetermined thickness, as illustrated in FIG. 9A, and is formed in such a manner that the thickness varies in proportion to the pressure and the speed of the touch input applied.

If the multiple layers are arranged, as lower layers under the first layer (that is, the uppermost layer), on the display unit 151 that is arranged in the front surface of the mobile terminal, based on a speed and a strength of the touch input being applied to the rear input unit, the controller 180 determines the number of layers to be activated as the second layers, among the multiple layers, while maintaining the state in which the first visual information is displayed on the first layer.

Specifically, if the speed and the strength of the touch input applied to the rear input unit 233 are below a predetermined value, the controller 180 activates only the lowermost layer. In contrast, if the speed and the strength of the touch input applied to the rear input unit 233 are the predetermined value or above (at this point, the number of predetermined values is two or greater corresponding to the multiple levels), in addition to the lowermost layer, the controller 180 activates more higher layers that are immediate over the lowermost layer.

For example, if the speed and the strength of the touch input applied to the rear input unit 233 are below a reference value, only a waiting screen 920 is activated that is displayed on the lowermost layer. Then, if the speed and the strength of the touch input applied to the rear input unit 233 are the reference value or above, the waiting screen 920 and a screen 930 being displayed on the higher layer are activated at the same time. If the screens 920 and 930 corresponding to the multiple layers are activated at the same time, the controller 180 applies a control command corresponding to the input applied to the rear input unit 233 to the screens 920 and 930 corresponding to the multiple layers at the same time.

On the other hand, related additional information pops up when an execution screen of an application being executed on the lowermost layer is controlled according to the operating of a rear input unit 1233.

At this point, the additional information popping up according to one embodiment of the present invention is described.

Figure 10:
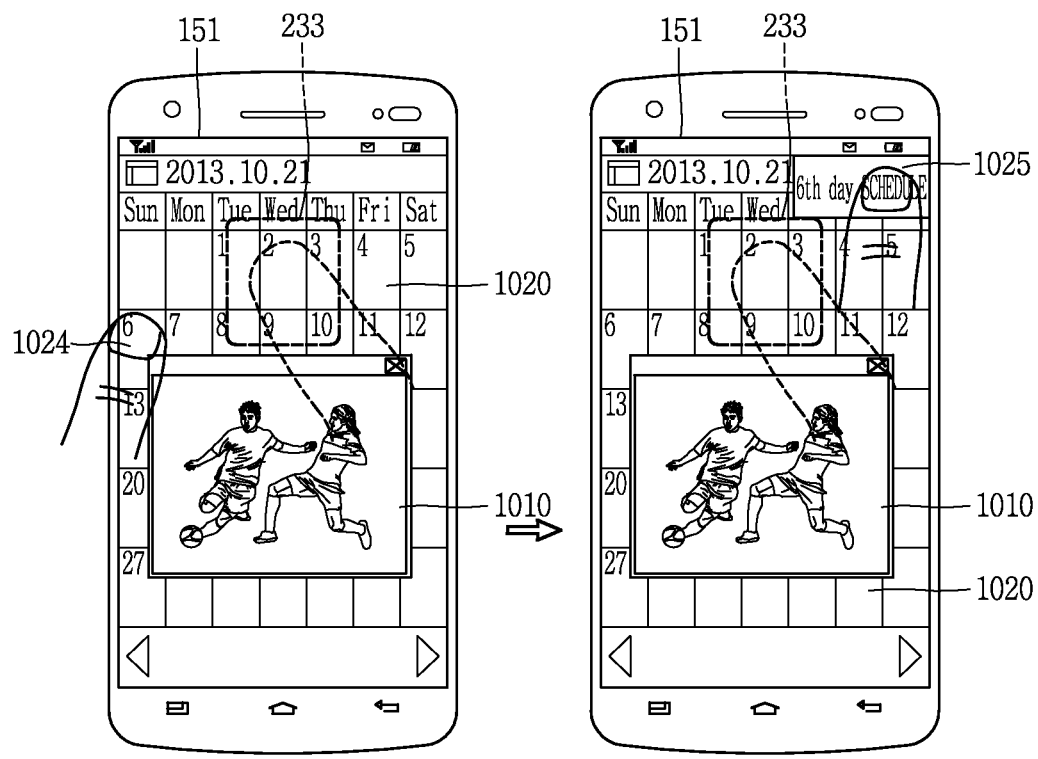
FIG. 10 is a diagram for describing a method of displaying information relating to the application being executed on the lower layer using the user input unit provided on the rear surface of the mobile terminal body in the mobile terminal according to one embodiment of the present invention.

FIG. 10 is a diagram for describing a method of displaying the information relating to the application being executed on the lower layer using the user input unit provided on the rear surface of the mobile terminal body in the mobile terminal according to one embodiment of the present invention.

First, the visual information corresponding to each of the multiple layers is displayed on the display unit 151 of the mobile terminal 100 according to the embodiment of the present invention.

At this point, there is no limit to the visual information corresponding to each of the multiple layers.

In addition, the front-surface input unit and the display unit 151 are assumed to be integrated into the touch screen. That is, when a first touch input is applied to the touch screen, the controller 180 applies a function corresponding to the first touch input to the first visual information. When the first touch input is applied to the touch screen in a state where the input is applied to the rear input unit 233, the controller 180 applies the function corresponding to the first touch input to the second visual information being displayed on the second layer.

If in this state, the function corresponding to the first touch input is applied to the first visual information, the controller displays information relating to the execution of the function corresponding to the first touch input on the higher layer over the first layer. That is, the additional information relating to the first visual information is displayed on the uppermost layer.

On the other hand, if the function corresponding to the first touch input is applied to the second visual information according to the input into the rear input unit 233, the controller 180 displays the information relating to the execution of the function corresponding to the first touch input on the lower layer under the first layer or on one region of the first layer that does not overlap the first visual information.

For example, if an execution screen 1020 of a calendar application is displayed on the lower layer of the display unit 151 and a moving image screen 1010 is displayed in the form of a floating window on the higher layer of the display unit 151 in FIG. 10, when the user performs the touch input corresponding to the selection of a specific object 1024 on the execution screen 1020 of the calendar application in a state where he/she touches on the rear input unit 233, corresponding detailed information 1025 is displayed on the higher layer to which the moving image screen 1010 is not output. That is, the detailed information 1025 and the moving image screen 1010 are displayed on the uppermost layer, and the execution screen 1020 of the calendar application is displayed on the lowermost layer.

In addition, if the function corresponding to the first touch input is applied to the second visual information according to the input into the rear input unit 233, the controller 180 sets whether the information relating to the execution of the function corresponding to the first touch input, for example, the additional information, is displayed on the lower layer or on the higher layer, in a different manner according to the importance of the additional information.

The various methods of operating the lower layer without any change to the visual information being displayed on the uppermost layer according to the input into the rear input unit 233, according to the embodiment of the present invention, are described above.

Methods are described below in which the lower layer is operated while minimizing the display change in the visual information displayed on the higher layer if all or most of the lower layer or an important portion thereof associated with the selection is covered with the higher layer, according to one embodiment of the present invention.

Figure 11:
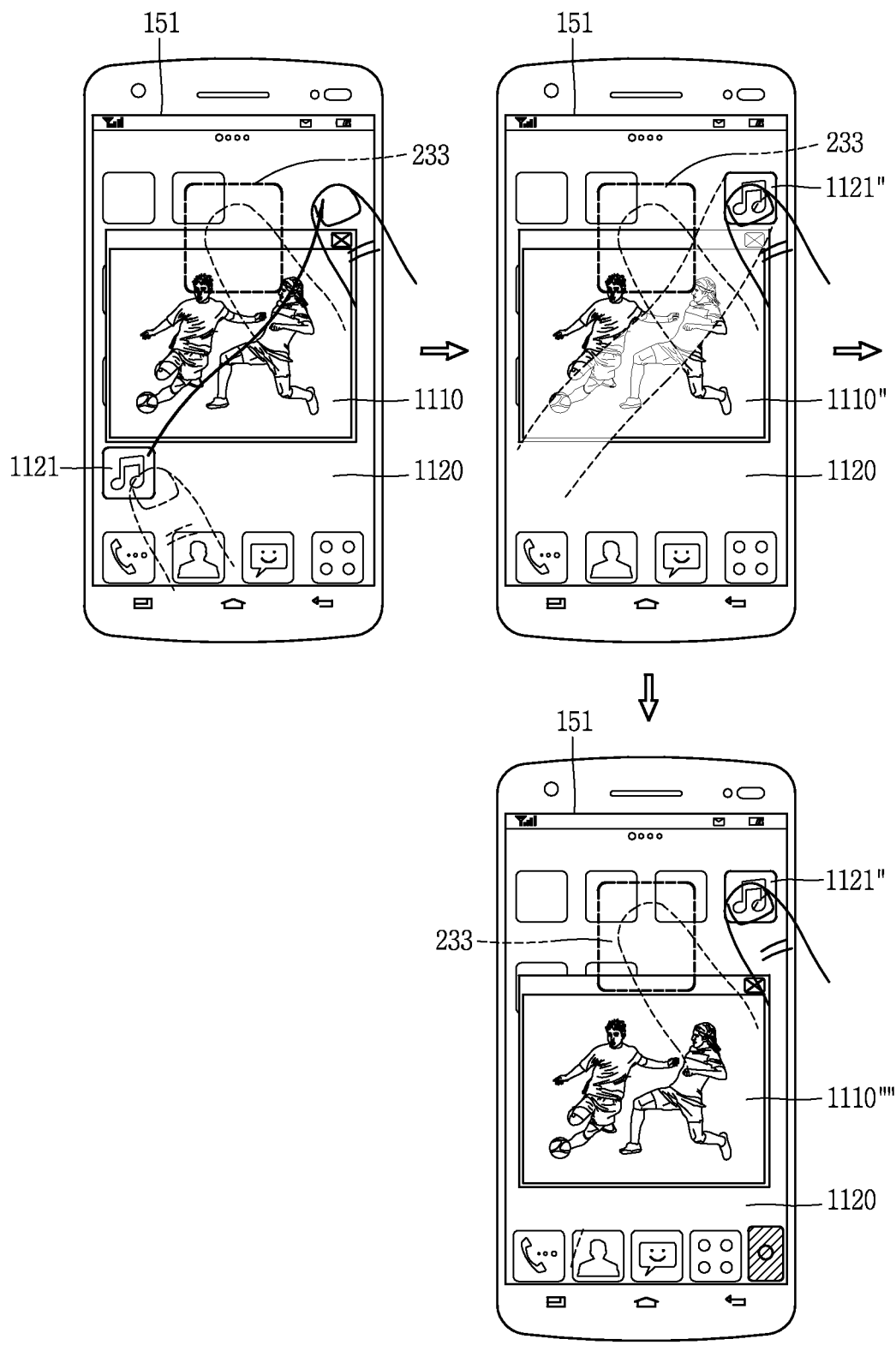
FIG. 11 is a diagram for describing a method of adjusting transparency of a higher layer when the application being executed on the lower layer is controlled using the user input unit provided on the rear surface of the mobile terminal body in the mobile terminal according to one embodiment of the present invention.

FIG. 11 is a diagram for describing a method of adjusting transparency of the higher layer when the application being executed on the lower layer is controlled using the user input unit provided on the rear surface of the mobile terminal body in the mobile terminal according to one embodiment of the present invention.

First, the visual information corresponding to each of the multiple layers is displayed on the display unit 151 of the mobile terminal 100 according to the embodiment of the present invention.

At this point, there is no limit to the visual information corresponding to each of the multiple layers.

Then, in a state where the touch input is applied to the rear input unit 233, in response to the dragging of the touch applied to the touch screen (which is assumed to be integrated with the front-surface input unit) within a region on which the first visual information is displayed, the controller 180 adjusts the transparency of the first visual information being displayed on the first layer according to the moving path and the touch trace of the touch.

In response to the adjustment of the transparency of the first visual information in this manner according to the touch, the controller 180 makes visible at least one portion of the second visual information that is covered with the first visual information while maintaining the state in which the first visual information is displayed on the first layer.

At this point, in order for the first visual information to be in line with the user's intention of controlling the lowermost layer, it is desirable that the first visual information of which the transparency is adjusted should return to its original state when a predetermined time (for example, two or three seconds) elapses.

In this manner, when the transparency of the first visual information returns to its original state when the predetermined time elapses, the controller 180 makes at least one portion of the second visual information covered back with the first visual information while maintaining the state in which the second visual information is displayed on the second layer.

For example, if the user moves an icon 1121 of a specific application included in a waiting screen 1120 displayed on the lowermost layer of the display unit 151 with the touch input being applied to the rear input unit 233 in FIG. 11, when the user touch and the icon 1121 passes by the moving image screen 1110 displayed on the uppermost layer, the transparency of the moving image screen 1110 is adjusted along the moving path and the touch trace of the touch, followed by the moving path and the touch trace of the icon 1121 (1110"). Then, the icon 1121 is rearranged at a point to which the touch is terminated (1121"). Then, when a predetermined time (for example, two to three seconds) elapses, a waiting screen 1120" of which the transparency is adjusted returns to its original state (1120"").

On the other hand, although not illustrated, even though the user applies the touch input only to the rear input unit 233, if the touch input or an object that is selected according to the touch input passes by the moving image screen 1110 displayed on the uppermost layer, the transparency of the moving image screen 1110 displayed on the uppermost layer is adjusted as described above.

Figure 12:
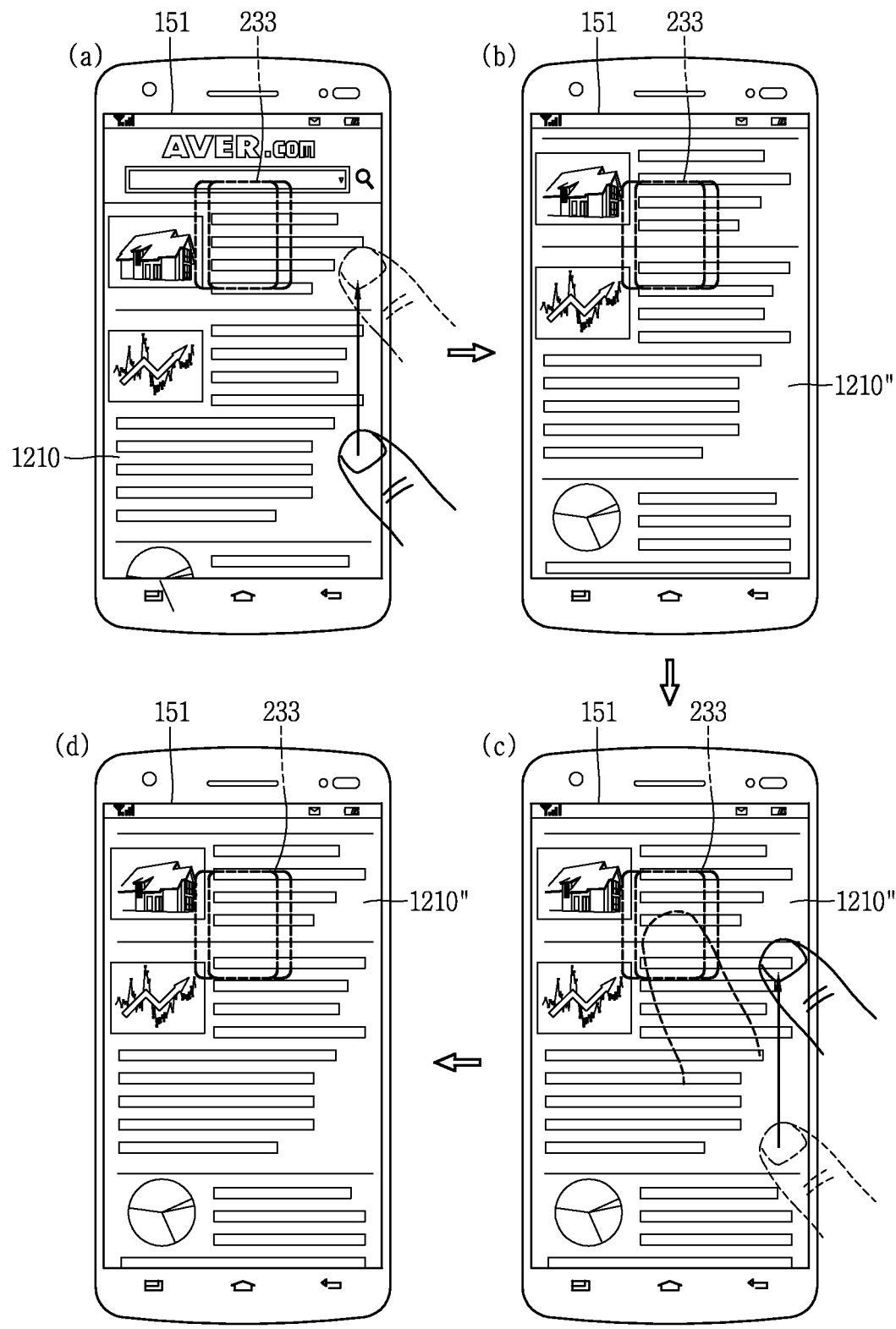
FIG. 12 is diagrams for describing a method of locking an existing function to an application being executed on the higher layer using the user input unit provided on the rear surface of the mobile terminal body in the mobile terminal according to one embodiment of the present invention.
Figure 13:
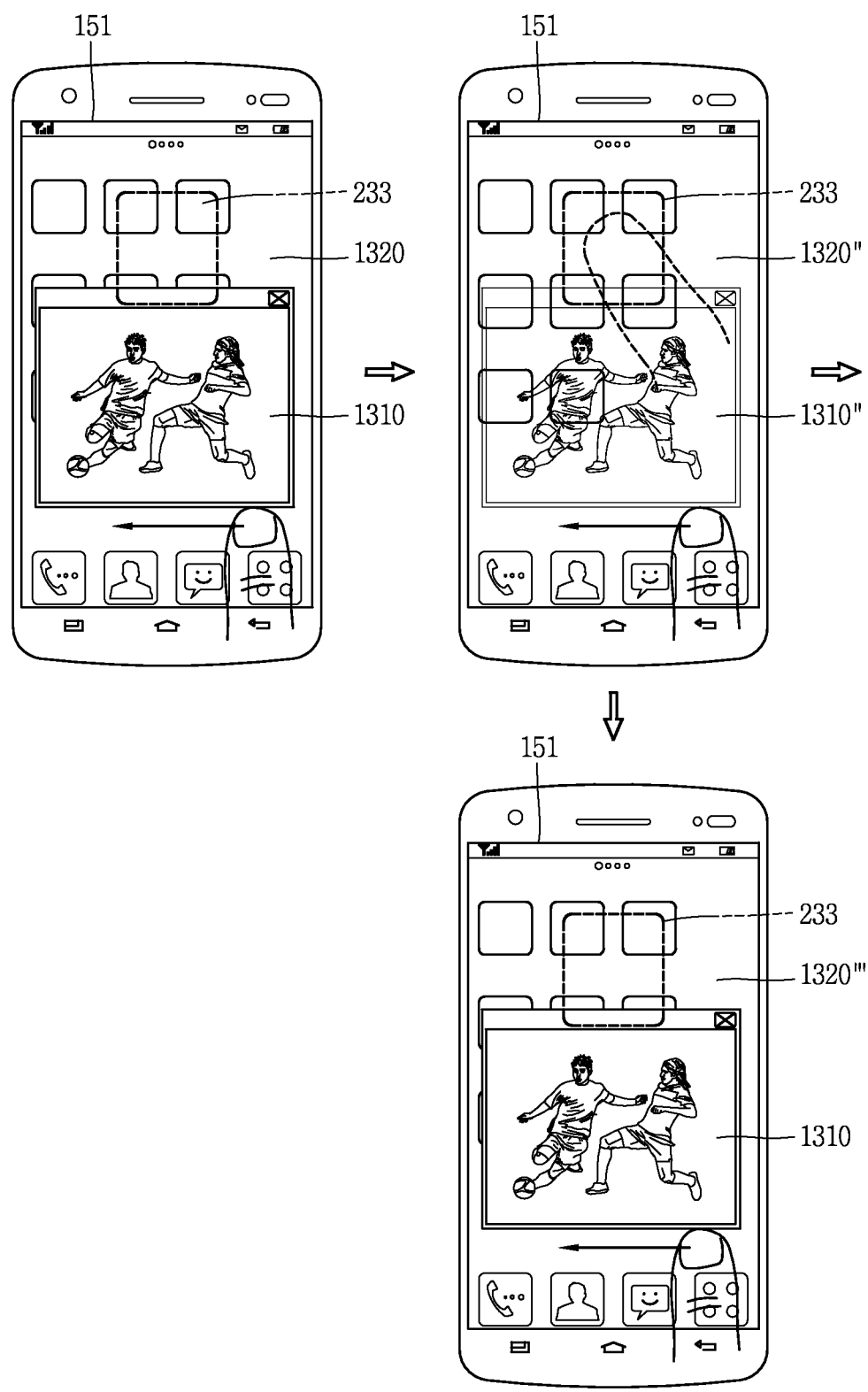
FIG. 13 is diagrams for describing a method of applying a different function from the existing function to the application being executed on the higher layer using the user input unit of the mobile terminal body in the mobile terminal according to one embodiment of the present invention.

The methods are mainly described above in which the lowermost layer is accessed and controlled using the rear input unit 233. Referring to FIG. 12 and FIG. 13, methods are described below in which a different function from the existing function is applied to the uppermost layer using the rear input unit 233.

FIG. 12 is diagrams for describing a method of locking the existing function to an application being executed on the higher layer using the user input unit provided on the rear surface of the mobile terminal body in the mobile terminal according to one embodiment of the present invention. FIG. 13 is a diagram for describing a method of applying a different function from the existing function to the application being executed on the higher layer using the rear input unit of the mobile terminal body in the mobile terminal according to one embodiment of the present invention.

First, the visual information corresponding to each of the multiple layers is displayed on the display unit 151 of the mobile terminal 100 according to the embodiment of the present invention. At this point, there is no limit to the visual information corresponding to each of the multiple layers.

In this manner, when the first touch input is applied to a region on which the first visual information displayed on the uppermost layer of the display unit 151 is displayed, the controller 180 applies the first function to the region on which the first visual information is displayed. For example, if a predetermined web page screen 1210 is displayed on the uppermost layer in FIG. 12 (*a*), when the flicking touch input is applied to the display unit 151 in one direction (for example, the downward direction), a screen 1210 is output in the one direction as illustrated in FIG. 12 (*b*).

In a state where the first touch input is applied, in this manner, to the region on which the first visual information is displayed, if it is detected that the input is applied to the rear input unit 233, the controller 180 performs control in such a manner that the first function is set to be locked. At this point, the state in which the first function is set to be locked means a state in which the first function is not applied, but is activated.

When this is done, while the input into the rear input unit 233 is maintained, the inputting of the control command into the first visual information is limited and only viewing is possible. On the other hand, there is no change in activating the lower layer on which the first visual information is displayed. For example, even though the user continues to apply the flicking touch input corresponding to the scroll function to a web page screen 1210" in FIG. 12 (*c*), if the input is applied to the rear-screen input unit 233, the web page screen 1210" is no longer scrolled as illustrated in FIG. 12 (*d*).

In addition, when a second touch input is applied to the display unit 151, the controller 180 apples a second function to a region on which the first visual information or the second visual information is displayed. In a state where the input is applied to the rear input unit 233, when it is detected that the second touch input is applied to the display unit 151, the controller 180 applies a third function different from the second function to the region on which the first visual information is displayed.

Specifically, in a state where the input is applied to the rear input unit 233, when the touch applied to the display unit 151 is dragged in one direction, the controller 180 adjusts an application level of the third function in a different manner according to the direction in which the touch is dragged and the extent to which the touch is dragged.

For example, in the state where the input is applied to the rear-screen input 233, when the touch applied to the display unit 151 is dragged in the first direction, the controller 180 gradually decreases the application level of the third function while maintaining the state in which the first visual information is displayed on the first layer. Then, when the touch is dragged in the second direction, the application level of the third function is gradually increased while maintaining the state in which the first visual information is displayed on the first layer.

In a state where the third function is applied to the first visual information in this manner, when a touch-up event occurs on the rear input unit 233, that is, when the touch applied to the rear input unit 233 is terminated, the controller 180 performs control in such a manner that the display of the first visual information returns to its state that is present before the third function is applied.

For example, as illustrated in FIG. 13, if a waiting screen 1320 is displayed on the uppermost layer of the display unit 151 and a TV screen 1310 corresponding to the QSLIDE (a registered trademark of LGE) function is displayed on the lowermost layer of the display unit 151, when the user performs the touch input in which the display unit 151 is dragged in one direction, the waiting screen 1320 displayed on the lowermost layer is switched to a different screen while the state in which the TV screen 1310 is output is maintained (the second function is applied to the second visual information).

On the other hand, when the user performs the touch input in which the display unit 151 (that is, the touch screen) is dragged in one direction, as described above, with the rear input unit 233 arranged on the rear surface of the mobile terminal being touched on, a transparent-window function is immediately applied to the TV screen 1310 (the third function is applied to the first visual information). Then, when the user terminates the touch applied to the rear input unit 233, the application of the transparent-window function is immediately canceled.

The transparent-window function illustrated in FIG. 13 is only an example. In all cases where multiple processes are necessary to apply a specific function to the visual information displayed on the uppermost layer, the specific function is possible to apply using the rear input unit 233. That is, the use of the rear input unit 233 makes it possible not only to control the lowermost layer without any display change in the uppermost layer, but also to apply a toggle function to the uppermost layer (a method of setting a function to be applied is possible to realize as an embodiment).

According to the embodiment of the present invention, the methods are described above in which in a stare where, the visual information corresponding to each of the multiple layers is displayed on the display unit 151, the lowermost layer and the uppermost layer are controlled in a fast, intuitive manner while maintaining the state of each layer.

Figure 14:
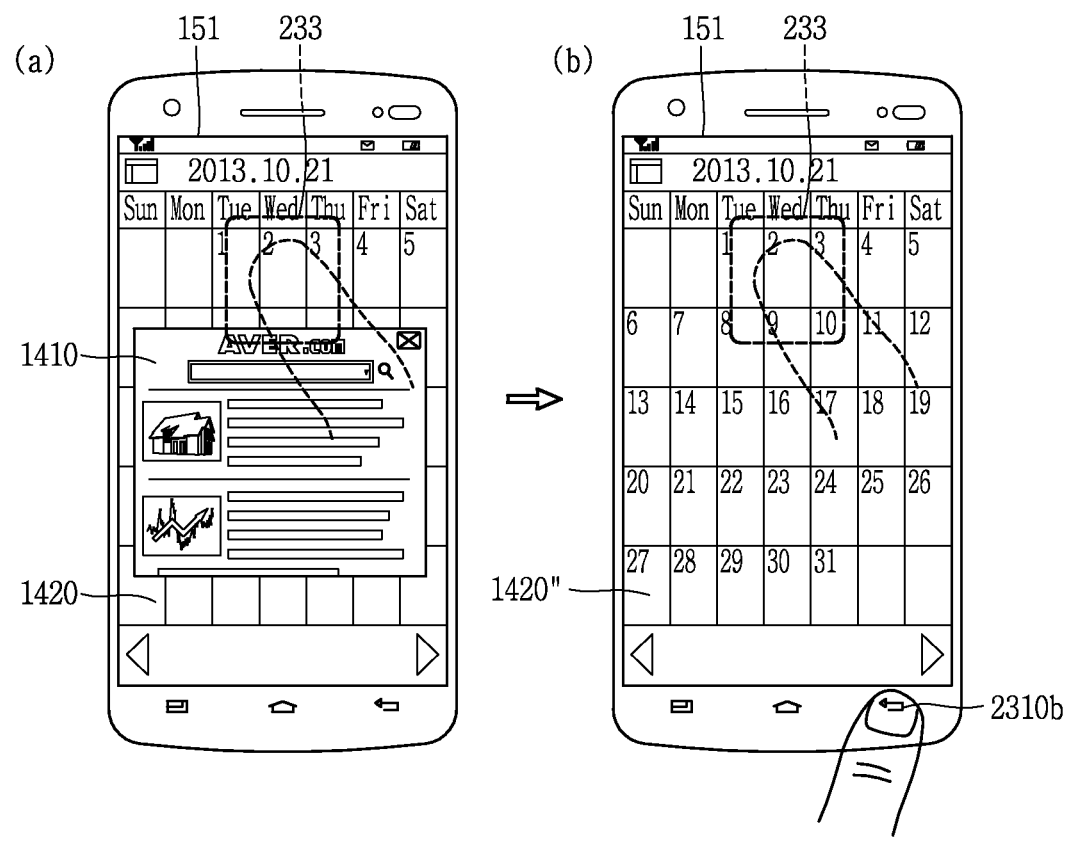
FIG. 14 is diagrams for describing a method of switching the order in which the layers are piled on top of one another using the user input unit provided on the rear surface of the mobile terminal body in the mobile terminal according to one embodiment of the present invention.

FIG. 14 is diagrams for describing a method of switching the order in which the layers are piled on top of one another using the user input unit provided on the rear surface of the mobile terminal body in the mobile terminal according to one embodiment of the present invention.

For example, there is a case where while continuously viewing an execution screen of an application being executed on the uppermost layer, the user controls the lowermost layer and occasionally desires to switch the display on the lowermost layer and the uppermost layer. In such a case, occasionally, a desired layer is selected and is display-switched in the related art. However, this causes inconvenience in that if many layers are executed on the display unit 151 and particularly the uppermost layer is displayed on the entire display unit 151, many operations are required to switch the lowermost layer to the uppermost layer.

In the mobile terminal 100 disclosed in the present specification, when the input is applied to a specific key in a state where the second layer (that is, the lowermost layer) is activated, the first layer (that is, the uppermost layer) and the second layer (that is, the lowermost layer) can be display-switched.

Specifically, in a state where the second layer (that is, the lowermost layer) is activated according to the application of the input to the rear input unit 233, if the input is successively applied to a specific key (for example, any one of a key included in the bezel portion, a side hard key, and a virtual key on the touch screen) on the front-surface input unit (including the touch screen), the controller 180 performs control in such a manner that the states of the second layer and the first layer are switched.

For example, in a state where the input is applied to the rear-surface unit 233 as illustrated in FIG. 14 (a), when it is detected, as illustrated in FIG. 14 (b), that the input is applied to a specific key 231b provided on the bezel portion corresponding to the front-surface input unit, layer switching is performed on a web page screen 1310 being displayed on the uppermost layer and an execution screen 1420 of the calendar application being displayed on the lowermost layer. Accordingly, only an execution screen 1420" of the calendar application is displayed on the front surface of the display unit 151.

On the other hand, when it is again detected, in this state, that the input is applied to the specific key 231b with the input applied to the rear input unit 233 being maintained, the layer switching is again performed on the execution screen 1420" of the calendar application being displayed on the uppermost layer and a web page screen 1410 being executed on the lowermost layer.

As described above, in the mobile terminal according to the embodiment of the present invention and the method of controlling the mobile terminal, the application being executed on the lower layer of the display unit is controlled using the user input unit provided on the rear surface of the mobile terminal body, while maintaining the state of the application being executed on the higher layer of the display unit. This provides the user with a convenient user interface. A different specific function from the existing function is immediately applied to the application being executed on the higher layer of the display unit, using the user input unit provided on the rear surface of the mobile terminal body and the touch screen. In addition, the desired control commands are input into the application being executed on the higher layer of the display unit and the application being executed on the lower layer, respectively, without any switching between the layers. Thus, effective multitasking is possible.

The configuration and the method of the embodiments according to the present invention, described above, are not applied in a limiting manner, but all of or some of the embodiments may be selectively combined with each other to create various modifications to the embodiments.

It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

The invention claimed is:

1. A mobile terminal comprising:
   a mobile terminal body configured to include a front surface and a rear surface;
   a touch screen that is arranged on the front surface configured to receive a touch input of a control command and display multiple pieces of visual information corresponding to multiple layers, respectively;
   a rear input unit that is arranged on the rear surface and configured to receive an input of the control command; and
   a controller configured to:
   in response to application of the touch input to the touch screen, apply a first function corresponding to the touch input to first visual information that is displayed on a first layer of the touch screen, and
   in response to application of the input to the rear input unit, activate a second layer that is arranged under the first layer while maintaining a state in which the first visual information is displayed on the first layer,
   wherein in a state where the touch input is applied to a region on which the first visual information is displayed, when it is detected that the input is applied to the rear input unit, the controller locks the first function.

2. The mobile terminal of claim 1, wherein the first visual information is a screen corresponding to a first application being executed on the uppermost layer of the touch screen, and second visual information that is displayed on the second layer is a screen corresponding to a second application being executed on the lowermost layer of the touch screen.

3. The mobile terminal of claim 1, wherein based on application of a flicking touch input in a direction to the rear input unit, the controller is configured to switch second visual information being displayed on the second layer to third visual information corresponding to the direction or to move an object included in the second visual information in the direction, while maintaining the state in which the first visual information is displayed on the first layer.

4. The mobile terminal of claim 1, wherein in a state where the input is applied to the rear input unit, when it is detected that a flicking touch input in a direction is applied to the touch screen, the controller is configured to switch second visual information being displayed on the second layer to third visual information corresponding to the direction or to move an object included in the second visual information in the direction, while maintaining the state in which the first visual information is displayed on the first layer.

5. The mobile terminal of claim 1, wherein in response to rotation of the input applied to the rear input unit in a first direction, the controller is configured to control to decrease an output range of second visual information being displayed on the second layer, while maintaining the state in which the first visual information is displayed on the first layer, and
wherein in response to the rotation of the input applied to the rear input unit in a second direction, the controller is configured to control to increase the output range of the second visual information being displayed on the second layer, while maintaining the state in which the first visual information is displayed on the first layer.

6. The mobile terminal of claim 1, wherein the controller is configured to determine whether or not the first layer is activated, according the order in which the input or the touch input is applied to the touch screen and the rear input unit.

7. The mobile terminal of claim 1, wherein when a touch event occurs on the rear input unit, the controller is configured to display a first icon corresponding to the touch event on one region of the touch screen, and
wherein in a state where the first icon is displayed, when a touch-up event occurs on the rear input unit, the controller is configured to control the touch screen in such a manner that the first icon disappears from the touch screen.

8. The mobile terminal of claim 1, wherein in response to successive application of a first and second inputs to the rear input unit, the controller is configured to control the touch screen in such a manner that an application associated with an object displayed on a region corresponding to the first input is executed on the second layer, while maintaining the state in which the first visual information is displayed on the first layer.

9. The mobile terminal of claim 1, wherein the rear input unit is configured in such a manner that a touch input can be applied, and
wherein when multiple layers are arranged as lower layers under the first layer, the controller is configured to determine the number of layers to be activated as the second layers among the multiple layers, based on a speed and strength of the touch input being applied to the rear input unit, while maintaining the state in which the first visual information is displayed on the first layer.

10. The mobile terminal of claim 1,
wherein when a first touch input is applied to the touch screen, the controller is configured to apply a function corresponding to the first touch input to the first visual information, and
wherein in a state where the input is applied to the rear input unit, when the first touch input is applied to the touch screen, the controller is configured to apply the function corresponding to the first touch input to second visual information being displayed on the second layer, while maintaining the state in which the first visual information is displayed on the first layer.

11. The mobile terminal of claim 10, wherein if the function corresponding to the first touch input is applied to the first visual information, the controller is configured to display information relating to execution of the function corresponding to the first touch input on a higher layer over the first layer, and
wherein if the function corresponding to the first touch input is applied to the second visual information according to the input into the rear input unit, the controller is configured to control the touch screen in such a manner that the information relating to the execution of the function corresponding to the first touch input is displayed on a lower layer under the first layer or on one region of the first layer that does not overlap the first visual information.

12. The mobile terminal of claim 10, wherein in a state where a touch input is applied to the rear input unit, in response to dragging of the touch applied to the touch screen within a region on which the first visual information is displayed, the controller is configured to adjust a transparency of the first visual information being displayed on the first layer according to a moving path and a touch trace of the touch screen.

13. The mobile terminal of claim 12, wherein in response to the adjustment of the transparency of the first visual information according to the touch, the controller is configured to make visible at least one portion of the second visual information that is covered with the first visual information while maintaining the state in which the first visual information is displayed on the first layer, and
wherein in response to return of the first visual information to its original state according to the passage of a predetermined time, the controller is configured to make at least one portion of the second visual information covered back with the first visual information, while maintaining a state in which the second visual information is displayed on the second layer.

14. The mobile terminal of claim 1,
wherein the controller is configured to:
apply a second function to a region on which the first visual information is displayed or second visual information displayed on the second layer when a second touch input is applied to the touch screen, and
apply a third function different from the second function to the region on which the first visual information is displayed, in a state where the input is applied to the rear input unit and when it is detected that a second touch input is applied to the touch screen.

15. The mobile terminal of claim 14, wherein in the state where the input is applied to the rear input unit, when the touch input applied to the touch screen is dragged in a direction, the controller is configured to adjust an application level of the third function in a different manner according to the direction in which the touch input is dragged and the extent to which the touch is dragged.

16. The mobile terminal of claim 15, wherein in the state where the input is applied to the rear input unit, when the touch input applied to the touch screen is dragged in a first direction, the controller is configured to decrease the application level of the third function gradually, while maintaining the state in which the first visual information is displayed on the first layer, and wherein in the state where the input is applied to the rear input unit, when the touch input is dragged in a second direction, the controller is configured to increase the application level of the third function gradually, while maintaining the state in which the first visual information is displayed on the first layer.

17. The mobile terminal of claim 14, wherein in a state where the third function is applied to the first visual information, when a touch-up event occurs on the rear input unit, the controller is configured to return the display of the first visual information to its state that is present before the third function is applied.

18. The mobile terminal of claim 1, wherein in a state where the input is applied to the rear input unit and the second layer is activated, if the input is successively applied to a specific key that is arranged on the front surface, the controller is configured to switch states of the second layer and the first layer.

19. A method of controlling a mobile terminal, the method comprising:

displaying multiple pieces of visual information corresponding to multiple layers, respectively, on a touch screen of the mobile terminal;

applying, via a controller of the mobile terminal, a first function corresponding to a touch input to first visual information being displayed on a first layer of the touch screen in response to application of the touch input to the touch screen;

activating, via the controller, a second layer arranged under the first layer while maintaining a state in which the first visual information is displayed on the first layer, in response to the application of an input to a rear input unit; and locking, via the controller, the first function in a state where the touch input is applied to a region on which the first visual information is displayed when it is detected that the input is applied to the rear input unit.

* * * * *